(12) United States Patent
Webster

(10) Patent No.: US 9,151,403 B2
(45) Date of Patent: Oct. 6, 2015

(54) VALVE ACTUATOR

(75) Inventor: David Wade Webster, Monmouth (GB)

(73) Assignee: KOP SURFACE PRODUCTS SINGAPORE PTE. LTD., Singapore Science Park (SG)

( * ) Notice: Subject to any disclaimer, the term of this patent is extended or adjusted under 35 U.S.C. 154(b) by 0 days.

(21) Appl. No.: 13/822,218

(22) PCT Filed: Nov. 2, 2011

(86) PCT No.: PCT/GB2011/052134
§ 371 (c)(1),
(2), (4) Date: Mar. 11, 2013

(87) PCT Pub. No.: WO2012/059759
PCT Pub. Date: May 10, 2012

(65) Prior Publication Data
US 2013/0168582 A1 Jul. 4, 2013

(30) Foreign Application Priority Data

Nov. 3, 2010 (GB) .................................. 1018553.6

(51) Int. Cl.
*F16K 31/12* (2006.01)
*F16K 31/122* (2006.01)
*F15B 15/14* (2006.01)
(Continued)

(52) U.S. Cl.
CPC ......... *F16K 31/1221* (2013.01); *F15B 15/1476* (2013.01); *F16K 31/163* (2013.01); *F16K 31/523* (2013.01); *F16K 31/54* (2013.01)

(58) Field of Classification Search
CPC ..... F16K 31/46; F16K 31/1221; F16K 17/36; F16K 31/523; F16K 31/163; F16K 31/54; F15B 15/1476

USPC ....................................... 251/74, 58, 63.6, 73
See application file for complete search history.

(56) References Cited

U.S. PATENT DOCUMENTS 1,103,944 A * 7/1914 Creighton ........................ 137/77
1,632,024 A * 6/1927 Dennison ................. 137/505.18
(Continued)

FOREIGN PATENT DOCUMENTS

GB 1278292 A 6/1972
JP 4248084 A 9/1992

OTHER PUBLICATIONS

Lanel, F., "International Search Report" for PCT/GB2011/052134, as mailed Mar. 20, 2012.

*Primary Examiner* — Marina Tietjen
*Assistant Examiner* — Umashankar Venkatesan
(74) *Attorney, Agent, or Firm* — Winstead PC

(57) ABSTRACT

The valve actuator (10) has a movable control element (12) which is typically connected to the valve to be opened/closed and a propulsion device (16) which may be a hydraulically operated piston (16) for moving the movable control element. A resilient element (22) which may be in the form of a spring arrangement has a stroke extending from a first relatively unloaded position to a second relatively loaded position and a transmission mechanism (18) is also provided, where the resilient element is loaded under the action of the propulsion device via the transmission mechanism and is configured to urge the moveable portion of the propulsion device towards the first position via the transmission mechanism when loaded. The transmission mechanism provides a gearing ratio reduction between the moveable portion of the propulsion device and the resilient element.

23 Claims, 18 Drawing Sheets

(51) Int. Cl.
*F16K 31/163* (2006.01)
*F16K 31/52* (2006.01)
*F16K 31/54* (2006.01)

(56) References Cited

U.S. PATENT DOCUMENTS

| | | |
|---|---|---|
| 4,070,002 A | 1/1978 | Bonafous |
| 4,519,575 A | 5/1985 | Akkerman et al. |
| 4,523,516 A * | 6/1985 | Foster et al. ............... 92/130 B |
| 4,527,631 A | 7/1985 | Vazquez |
| 4,791,856 A | 12/1988 | Heim et al. |
| 4,871,143 A * | 10/1989 | Baker ............... 92/130 B |
| 5,215,286 A * | 6/1993 | Kolenc ............... 251/58 |
| 5,253,671 A * | 10/1993 | Kolenc ............... 251/58 |
| 5,516,075 A * | 5/1996 | Itoi et al. ............ 251/58 |
| 5,556,072 A * | 9/1996 | Itoi et al. ............ 251/58 |
| 5,653,419 A | 8/1997 | Uchisawa et al. |
| 6,269,642 B1 | 8/2001 | Arnold et al. |
| 6,487,960 B1 * | 12/2002 | Chatufale ............ 92/165 R |
| 7,303,176 B2 * | 12/2007 | Tokuda et al. ............ 251/58 |
| 2005/0269534 A1 | 12/2005 | Tanikawa et al. |

* cited by examiner

VALVE ACTUATOR

FIELD OF THE INVENTION

The present invention relates to a valve actuator, especially those used in conjunction with gate valves and oil and gas pipelines.

BACKGROUND OF THE INVENTION

Valve actuators are used to open or close valves. They are often pneumatic or hydraulic, and use a cylinder and piston arrangement to move a control rod. The control rod will be attached to the gate of a gate valve, and by filling or emptying the piston with an appropriate working fluid, the gate may be moved and the valve opened or closed.

A typical design will comprise a piston deployed within a chamber, the piston being attached to a control rod. The piston will define two chambers within the actual chamber: a first chamber and a second chamber. The first chamber will be subjected to the working fluid acting upon the piston, and will include a working fluid inlet. To enable the piston and control rod to return to a certain position, be it open or closed, the second chamber will include some form of resilient bias, such as a spring. As the working fluid is pumped into the first chamber under pressure, the fluid will act on the piston, expanding the first chamber, and compressing the second chamber and the spring. The movement of the piston will in turn move the control rod and gate, thus moving the valve typically from a closed to an open position. Once the fluid pressure is released, the force stored in the spring will act upon the piston, re-expanding the second chamber and compressing the first chamber, thus typically moving the valve from an open to a closed position.

When the pressure is vented, the valve is preferably arranged such that the compressed spring drives the valve to the closed position. This valve set-up is often used as part of a 'fail safe' system and in some cases such as when actuators are used to operate X Tree production master valves, a combination of the actuator spring closing force and the valve gate are used to cut wire or logging cable, so that if the valve is required to close in an emergency, it can do so even during times when work over operations are under way. A great deal of force is required, not only to overcome the valve drag but also to cut cable.

The inventor of the present invention has recognised that a major driver in the design of such actuators is the spring requirement and often the size of an actuator is dictated by the size of the closing spring. Space is a constraint in many processing facilities, be it in subsea manifolds or in petro chemical processing facilities. Weight is also an issue, particularly where deployment of hardware involves lifting large packages of equipment into deep water.

A disadvantage of such an arrangement is that the chamber must be a considerable length in order to house the spring and allow for the necessary movement of the piston, leading to a large and cumbersome actuator.

More importantly, conventional actuators suffer from a major disadvantage that the closing force supplied by the resilient element/spring directly to the moving actuator is not constant, because the spring effectively supplies more closing force at the beginning of the closing stroke than at the end, but it is typically at the end of the stroke that a great deal of force is required to finish the closing stroke, particularly to cut the cable if present.

SUMMARY OF THE INVENTION

According to a first aspect of the present invention there is provided a valve actuator comprising:

a movable control element;
a propulsion device for moving said movable control element, the propulsion device comprising a moveable portion having a stroke extending from a first position to a second position;
a resilient element, having a stroke extending from a first relatively unloaded position to a second relatively loaded position; and
a transmission mechanism;
the resilient element being loaded under the action of the propulsion device via the transmission mechanism and being configured to urge the moveable portion of the propulsion device towards the first position via the transmission mechanism when loaded;
wherein the transmission mechanism provides a gearing ratio between the moveable portion of the propulsion device and the resilient element.

The resilient element is normally loaded under the action of the propulsion device when the propulsion device moves from the first position to the second position. "Loaded" includes partially loaded, that is before the resilient element's stroke has reached the relatively unloaded position.

The gearing ratio may be a gearing increase or a gearing decrease, but is preferably a gearing ratio decrease, that is, a gearing reduction ratio from the moveable portion of the propulsion device to the resilient element.

The gearing reduction ratio refers to gearing to reduce the distance of the stroke from the longer stroke of the moveable portion of the propulsion device to the shorter stroke of the resilient element. This is regardless of whether the propulsion device is loading the resilient element, or the loaded resilient element is urging the moveable portion of the propulsion device towards the first position.

Unless otherwise stated, the 'stroke' refers to the distance of the stroke. Thus the gearing reduction ratio causes the stroke of the resilient element to be less than the stroke of the propulsion device, normally averaged over the entire stroke of said moveable portion of the propulsion device and resilient element. The gearing reduction ratio may comprise a gearing reduction ratio of at least 2:1, preferably around 3:1 and optionally up to 6:1 or more.

Thus one benefit of certain embodiments is that since the stroke of the resilient element is smaller, a smaller resilient element may be used and the actuator may be more compact.

In preferred embodiments, the transmission mechanism is adapted to vary the gearing ratio, especially the gearing reduction ratio between the moveable portion of the propulsion device and the resilient element within the stroke of the moveable portion of the propulsion device and the resilient element. That is, at one or more points in the stroke, it will be geared to a different ratio than another one or other more points in that stroke.

Thus the gearing reduction ratio is preferably reduced which, by this or other means, increases the force on the moveable portion of the propulsion device, derived from the urging of the loaded resilient element, as the resilient element nears one end of its stroke, that is, between 50% and 95% through its stroke, maybe more than 70% through its stroke, often more than 80% and optionally more than 90%.

In particular the transmission mechanism is preferably adapted to increase the force of the moveable portion of the propulsion device as it nears one end of its stroke, that is, between 50% and 95% through its stroke, maybe more than 70% through its stroke, often more than 80% and optionally more than 90%.

The gearing reduction ratio may be increased which, by this or other means, decreases the force on the moveable portion of the propulsion device, derived from the urging of the loaded resilient element, as the resilient element nears another end of its stroke, that is, between 50% and 95% through its stroke, maybe more than 70% through its stroke, often more than and 80% optionally more than 90%.

Often in use, as the moveable portion nears one end of its stroke, significant opposing forces are encountered, for example a cable may need to be sheared by a gate valve attached to the control rod, and so the transmission mechanism in use increases the force to (at least) attempt to overcome these opposing forces.

The resilient element within the actuator has a stroke extending from a first relatively unloaded position to a second relatively loaded position. For example a spring may be relaxed in the first position and compressed in the second position. (Note, outside the actuator a wider range of motion of the resilient element may be possible but it is preferred not to use the entire range of motion within the actuator. Thus loaded and unloaded as used herein are to be construed as relatively loaded and relatively unloaded and not necessarily the most loaded and most unloaded range of motion available to the resilient element).

Preferably the gearing reduction ratio is reduced (for example from 3:1 to 2:1) at a point close to the first relatively unloaded position of the resilient element; that is, more than 70% of the distance towards the relatively unloaded position, often more than 80% and optionally more than 90%. Thus by this or other means, and because the gearing reduction ratio increases from the relatively unloaded position (for example 2:1) to the relatively loaded position (by which time the ratio could be for example 6:1 or even 10:1 or higher), the transmission mechanism is adapted to increase the force applied by the moveable portion of the propulsion mechanism to the resilient element, at a point close to the second relatively loaded position of the resilient element; in other words, less force is required to be applied to the transmission mechanism by the propulsion mechanism to put the same force into the resilient element as the gearing reduction ratio increases; that is, more than 70% of the distance towards the relatively loaded position, often more than 80% and optionally more than 90%.

The gearing reduction ratio may be increased (for example from 3:1 to 6:1 or even 10:1) at a point close to the second relatively loaded position of the resilient element; that is, more than 70% of the distance towards the relatively loaded position, often more than 80% optionally more than 90%. Thus by this or other means, and because the gearing reduction ratio decreases from the relatively loaded position (for example 6:1) to the relatively unloaded position (by which time the ratio could be for example 4:1 or even 2:1 or lower), the transmission mechanism is adapted to decrease the force applied by the moveable portion of the propulsion mechanism to the resilient element, at a point close to the first relatively unloaded position of the resilient element; in other words, more force is required to be applied to the transmission mechanism by the propulsion mechanism to put the same force into the resilient element as the gearing reduction ratio decreases; that is, more than 70% of the distance towards the relatively unloaded position, often more than 80% and optionally more than 90%.

Thus in contrast to known actuators, where a resilient element tends to reduce its force as it nears its relatively unloaded position (and so reduce the force of a coupled control rod) such embodiments of the present invention work in contrast to this normal functionality by the transmission mechanism of the present invention concentrating the force of the resilient element around this point in order to increase the force of the moveable portion of the propulsion device.

The propulsion device acting through the transmission mechanism may be direct, i.e. the propulsion device acts directly upon the transmission mechanism and the transmission mechanism acts directly upon the resilient element, or it may be indirect i.e. one or more intervening components may be disposed between the propulsion device, the transmission mechanism and/or the resilient element. Moreover, it will be understood that by loading we mean the act of applying a force to the resilient device. Preferably this will be the compression of a compression spring, but may optionally be the application of tension to a tension spring, or torque to a torsion spring and so forth. The stroke or movement of the resilient device is thus the compression, tension or torsion as described.

For the embodiments where the resilient element is a spring, a coil spring is an option, normally using relatively thick wire but preferably the resilient element comprises a stack of disc springs. Normally there are more than 10 disc springs, normally less than 30. One embodiment comprises 22 disc springs in the disc spring stack. Embodiments with disc springs are particularly beneficial because they can be stacked to provide redundancy should one of the discs break or fail for any reason. In contrast, coiled springs have no redundancy because if the spring is broken in one place the two resulting pieces will tend to fall inside/outside one another when compressed. Moreover if a coil becomes permanently deformed, it will not extend to the critical end of its stroke and not close the attached valve. A disc spring stack can provide a degree of redundancy for this. Preferably the propulsion device is a piston and cylinder arrangement, more preferably is a hydraulic piston and cylinder arrangement.

Preferably the piston and cylinder arrangement is actuated by the introduction or removal of a hydraulic fluid, more preferably introduction of a hydraulic fluid causes the movement of the cylinder away from the piston, thereby loading the resilient element.

Preferably the resilient element is disposed around the outside of the propulsion device. Alternatively the propulsion device may be disposed around the resilient element. This allows for efficient use of common volumes.

Preferably the hydraulic piston arrangement comprises a piston, a cylinder disposed around said piston and a cylinder sleeve disposed around said cylinder. More preferably said piston and cylinder sleeve are joined, providing an annular gap or volume for receiving the cylinder.

Preferably said piston and also preferably the cylinder sleeve are static within the actuator, and said cylinder may move within the annular gap or volume between the piston and cylinder sleeve. Thus preferably the moveable portion of the propulsion device is the cylinder.

Preferably the resilient element is attached to a first plate at its first end and a second plate at its second end, more preferably said first plate is moveable and said second plate is fixed.

Preferably said piston and cylinder sleeve may be selectively decoupled to allow for selective relative movement of the two.

In one aspect, the propulsion device acts upon the resilient element through the transmission mechanism which comprises a lever.

The lever and moveable portion of the propulsion device can engage by any suitable means e.g. pads. In preferred embodiments however, a roller is provided to interface between these components and is normally provided on the moveable portion of the propulsion device which engages the lever.

In order to vary the gearing ratio between the moveable portion of the propulsion device and the resilient element, and especially to reduce the gearing reduction ratio, the lever is preferably specially shaped, and the moveable portion of the propulsion device follows this shape to transmit additional movement/force at a particular point in the stroke of the moveable portion of the propulsion device. In particular a notch and/or shoulder (preferably both) may be provided on the lever so that a relatively steep gradient exists on the surface of the lever which will, in use, increase the force or movement transmitted from the resilient element to the moveable portion of the propulsion device at a particular point of the stroke of the moveable portion of the propulsion device.

For certain embodiments, one side of said lever is in contact with said first plate, and preferably the opposite side (through a fulcrum) of said lever is in contact with a moveable part of said piston and cylinder arrangement. Thus as the cylinder moves down the spring stack is compressed by being pushed up, and vice versa.

In alternative embodiments, the lever is arranged to move an attached bearing ring in the same direction as that of the cylinder, and thus compresses the resilient element from an opposite end. Normally a spindle is provided to connect the lever to the bearing ring. Thus as the cylinder moves down the spring stack is compressed from above by downward movement.

In a second aspect the transmission device comprises a rack and pinion mechanism.

The rack is normally connected to or provided on the movable portion of the propulsion device. A second, normally static, rack may also be provided to engage with the pinion. Normally an axle extends through the pinion and also engages with said first plate connected to the resilient element. Thus for such embodiments, as the moveable portion of the propulsion device moves, the rack thereon engages and rotates the pinion, which via the axle engaging with the first plate, loads (and strokes) the resilient element.

In order to vary the gearing ratio between the moveable portion of the propulsion device and the resilient element, and especially to reduce the gearing reduction ratio, the axle is preferably provided in the pinion in an off-centre position. Thus in use it will rotate and, depending on its start and finishing position, either increase or decrease the movement/force afforded to the moveable portion of the propulsion device as the pinion rotates through the rack.

Normally the transmission mechanism is configured such that compared to the starting position of the axle, the gearing reduction ratio is reduced at a point close to the first relatively unloaded position of the resilient element; that is, more than 70% of the distance towards the relatively unloaded position, often more than 80% and optionally more than 90%. Thus the axle is normally provided in the pinion such that rotation of the pinion at least 70% of the distance towards the relatively unloaded position, often more than 80% optionally more than 90%, increases the force of the stroke of the resilient element compared to its force at other positions.

The actuators according to the present invention are preferably relatively compact compared to known actuators for equivalent output ratings. For actuators designed to couple to larger valves, larger actuators will be required.

Typically actuators according to the present invention are more than 600 mm in height, often more than 800 mm. Typically they are less than 1400 mm in height, often less than 1100 mm.

Preferably the actuators of the present invention comprising a transmission mechanism based on a lever are 600-1000 mm in height, preferably 800-900 mm in height.

Actuators requiring increased output, such as for larger valves, are preferably based on having a transmission mechanism based on a rack and pinion mechanism. Such embodiments preferably have a height of 700 to 1400 mm, more preferably 850 to 1100 mm.

The moveable control element is normally connected to the moveable portion of the propulsion device. For certain embodiments they may be provided as a single piece.

According to a further aspect of the present invention there is provided a valve including a valve actuator according to the first aspect of the present invention.

According to a yet further aspect of the present invention there is provided a pipeline including at least one valve according to the second aspect of the present invention.

According to a further aspect of the present invention there is provided a valve actuator comprising:
    a movable control element;
    a propulsion device for moving said movable control element, the propulsion device comprising a moveable portion having a stroke extending from a first position to a second position;
    a resilient element, having a stroke extending from a first relatively unloaded position to a second relatively loaded position; and
a transmission mechanism;
    the resilient element being loaded under the action of the propulsion device via the transmission mechanism and being configured to urge the moveable portion of the propulsion device towards the first position via the transmission mechanism when loaded;
    wherein the transmission mechanism comprises a rack and pinion mechanism.

The rack and pinion mechanism is preferably the rack and pinion mechanism as described herein.

According to a further aspect of the present invention there is provided a valve actuator comprising:
    a movable control element;
    a propulsion device for moving said movable control element, the propulsion device comprising a moveable portion having a stroke extending from a first position to a second position;
    a resilient element, having a stroke extending from a first relatively unloaded position to a second relatively loaded position; and
a transmission mechanism;
    the resilient element being loaded under the action of the propulsion device via the transmission mechanism and being configured to urge the moveable portion of the propulsion device towards the first position via the transmission mechanism when loaded;
    wherein the transmission mechanism is adapted to vary a gearing ratio between the moveable portion of the propulsion device and the resilient element within the stroke of the moveable portion of the propulsion device and the resilient element.

According to a further aspect of the present invention there is provided a valve actuator for a gate valve comprising:
    a movable control element;
    a propulsion device for moving said movable control element, the propulsion device comprising a moveable portion having a stroke extending from a first position to a second position;

a resilient element, having a stroke extending from a first relatively unloaded position to a second relatively loaded position; and a transmission mechanism;

the resilient element being loaded under the action of the propulsion device via the transmission mechanism and being configured to urge the moveable portion of the propulsion device towards the first position via the transmission mechanism when loaded;

wherein the resilient element comprises a plurality of disc springs.

The disc springs are preferably the disc springs described herein. Such embodiments are especially useful when used with a gate valve.

According to a further aspect of the present invention there is provided a transmission mechanism apparatus comprising:

a movable control element;

a propulsion device for moving said movable control element, the propulsion device comprising a moveable portion having a stroke extending from a first position to a second position;

a plurality of disc springs, having a stroke extending from a first relatively unloaded position to a second relatively loaded position; and a transmission mechanism;

the plurality of disc springs being loaded under the action of the propulsion device via the transmission mechanism and being configured to urge the moveable portion of the propulsion device towards the first position via the transmission mechanism when loaded;

wherein the transmission mechanism provides a gearing ratio between the moveable portion of the propulsion device and the resilient element.

Thus such embodiments can be used as a transmission mechanism for different purpose not limited to actuators for gate valves.

BRIEF DESCRIPTION OF THE DRAWINGS

Reference will now be made, by way of example only, to the accompanying drawings, in which:

FIG. 19$b$ is a front view of the third embodiment of an actuator in accordance with the present invention.

FIG. 2 shows a valve actuator 10 according to a first aspect of the present invention including a movable control rod 12, a piston 14 housed within a cylinder 16, a plurality of levers 18 acting around lever pivot pins 20, and a spring arrangement comprising a plurality of disc springs 22 disposed around the cylinder 16.

Figure 1:
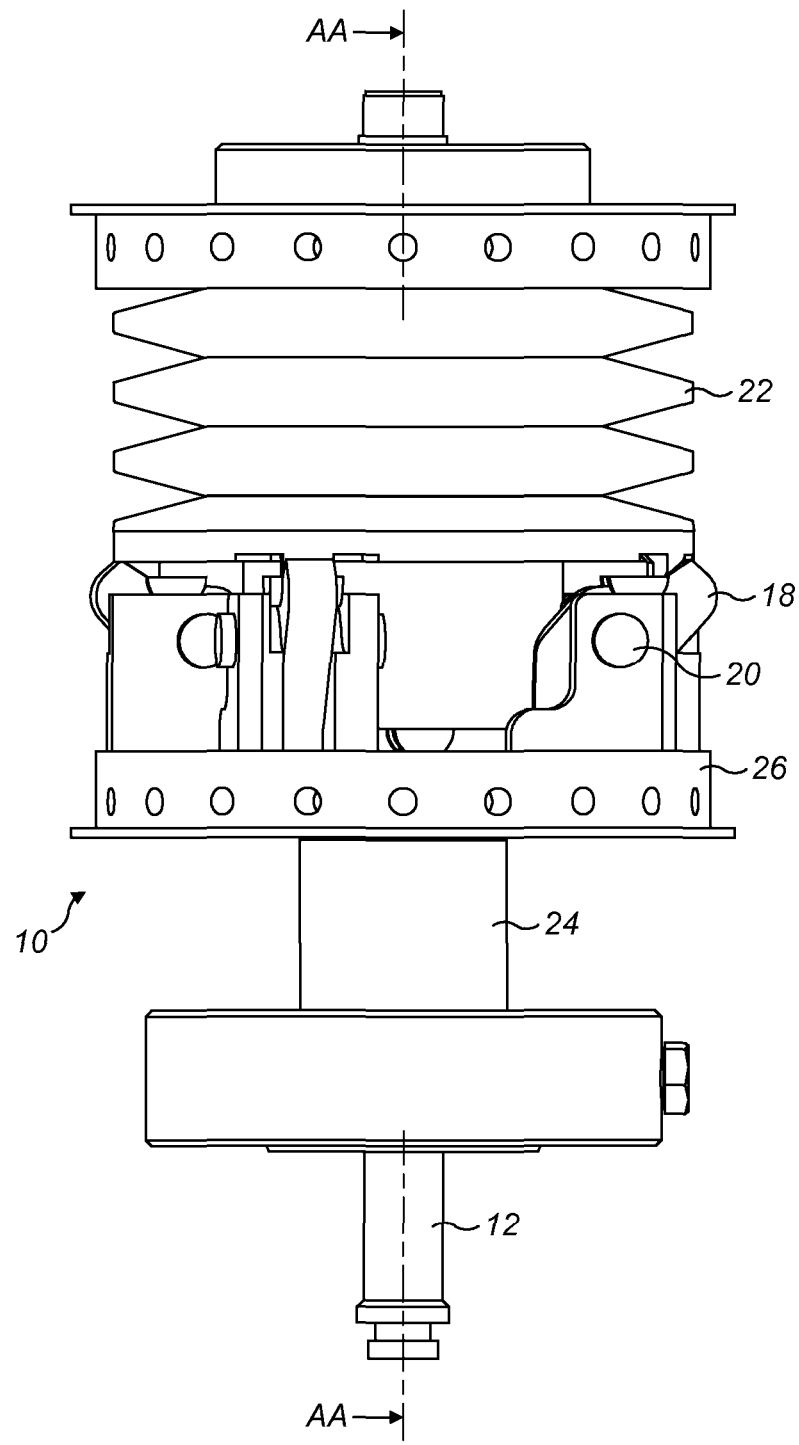
FIG. 1 is a side elevation of a valve actuator according to a first aspect of the present invention.
Figure 2:
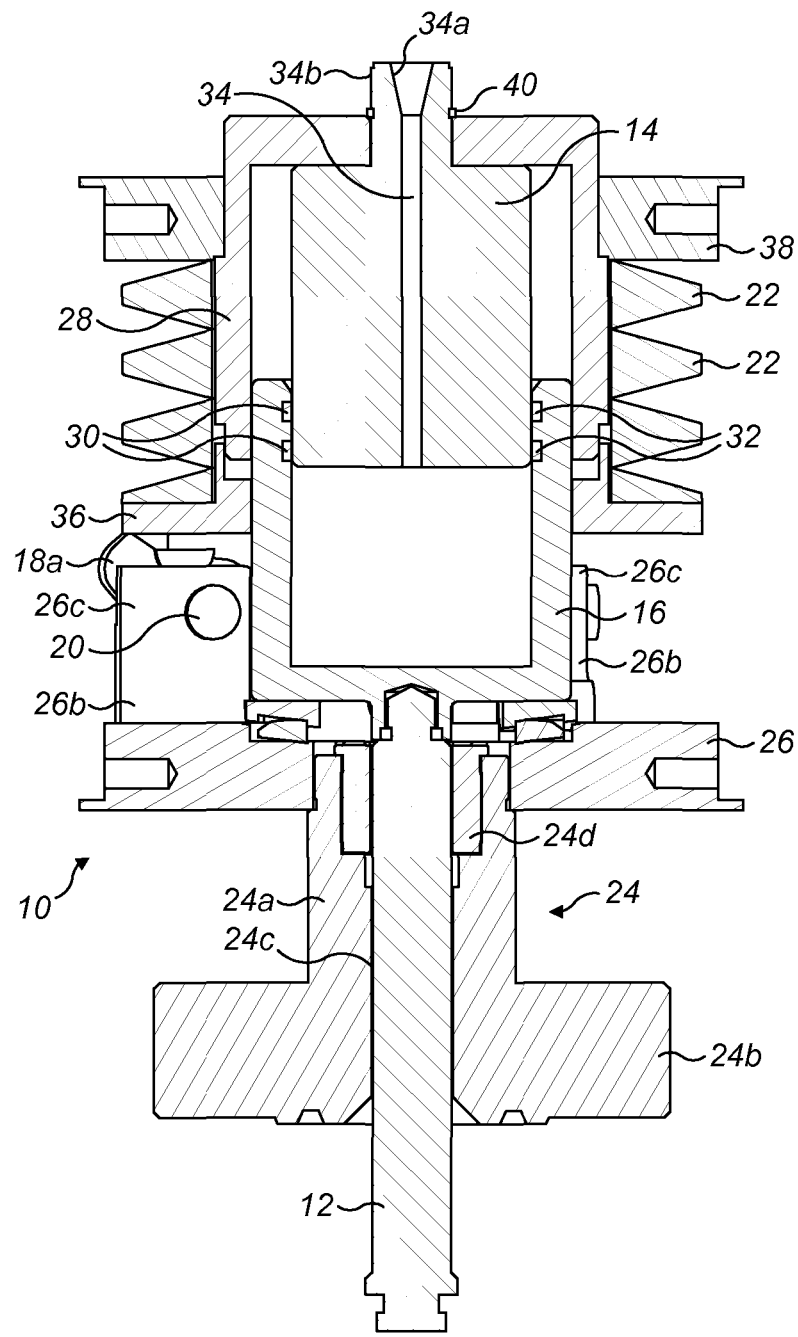
FIG. 2 is a sectional view of the valve actuator of FIG. 1 taken on AA-AA with the valve actuator in an open position.
Figure 3:
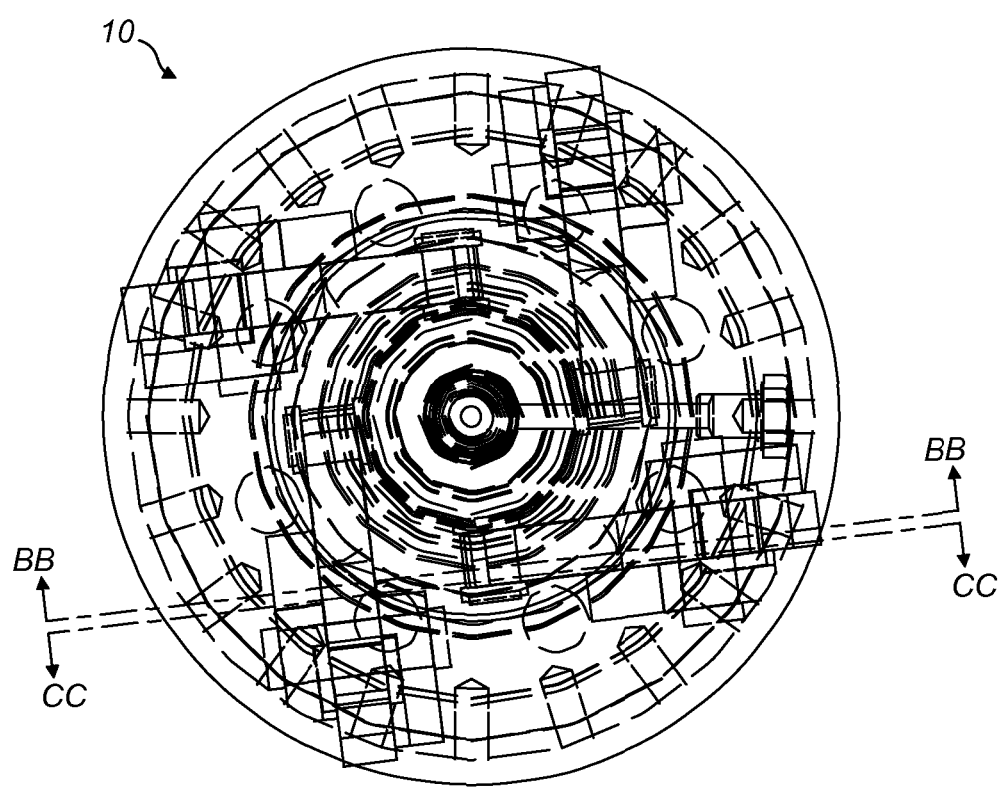
FIG. 3 is a plan view of the valve actuator of FIG. 1.

As described in more detail further below, the cylinder 16, around the stationary piston 14, is configured to move from the position shown in FIG. 14 downwards (as viewed), together with an attached control rod 12 and a gate valve 100 (shown in FIGS. 10-13) in order to open the valve 100 to the position shown in FIG. 2. In order to provide a fail-safe closure mechanism for the valve 100 in the event of a power failure, the cylinder 16 is biased in an upwards direction by the disc springs 22 via L-shaped levers 18. A particular advantage of preferred embodiments of the present invention is that the levers 18 are shaped such that longitudinal movement of cylinder 16 is translated to smaller longitudinal compression of the spring 22. This allows more compact actuators to be used. The movable control rod 12 is arranged within a control rod body 24, which comprises a cylindrical main body section 24$a$ and a connection flange 24$b$. Within an upper portion of the main body section 24$a$, disposed between the movable control rod 12 and an inner bore 24$c$ of control rod body 24 is a packing retainer 24$d$. The packing retainer 24$d$ acts as a bushing and a seal for the movable control rod 12.

Connected around the outside of an upper portion of the main body section 24$a$ of the control rod body 24 is a lever plate 26. Extending perpendicularly from the upper surface 26$a$ of the lever plate 26 are lever brackets 26$b$. The lever brackets 26$b$ each comprise two separate lugs 26$c$. The levers 18 are each disposed between a set of these lugs 26$c$, one set per lever bracket 26$b$. The lever brackets 26$b$ and levers 18 are provided with corresponding bores, with the lever pivot pins 20 being arranged through these corresponding bores resulting in the levers 18 being mounted upon the lever brackets 26$b$ and retained within them, but allowing relative rotation of the levers 18 with respect to the lever brackets 26$b$.

Figure 4:
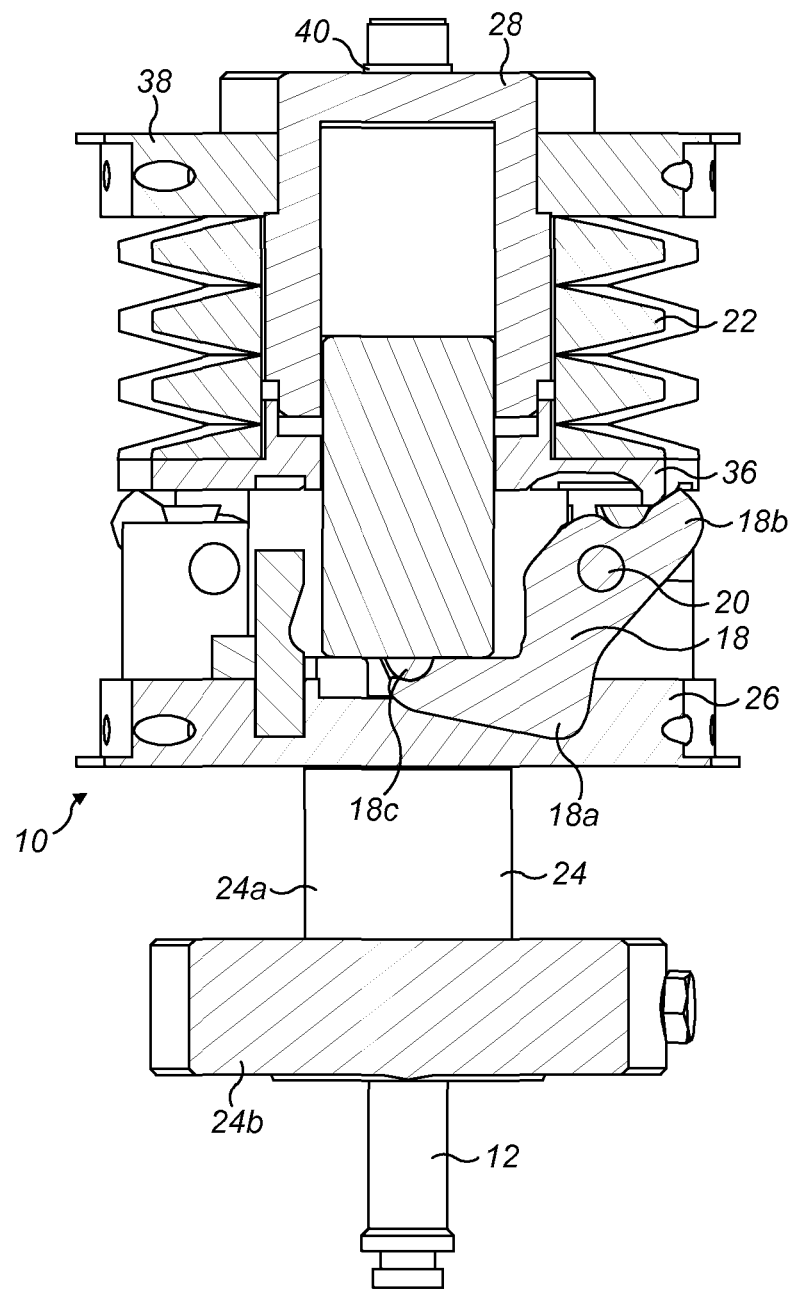
FIG. 4 is a sectional view of the valve actuator of FIG. 1 taken on BB-BB from FIG. 3 with the valve actuator in an open position.
Figure 5:
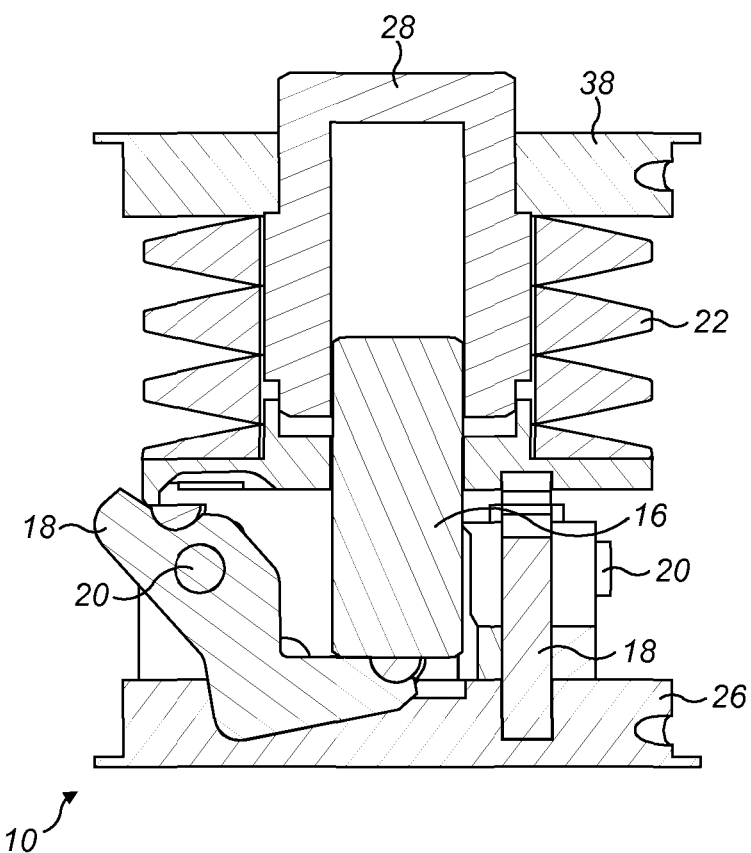
FIG. 5 is a sectional view of the valve actuator of FIG. 1 taken on CC-CC from FIG. 3 with the valve actuator in an open position.
Figure 5:
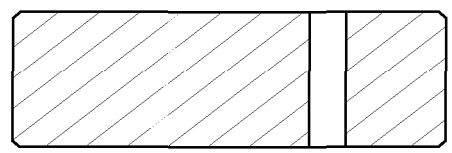
Figure 6:
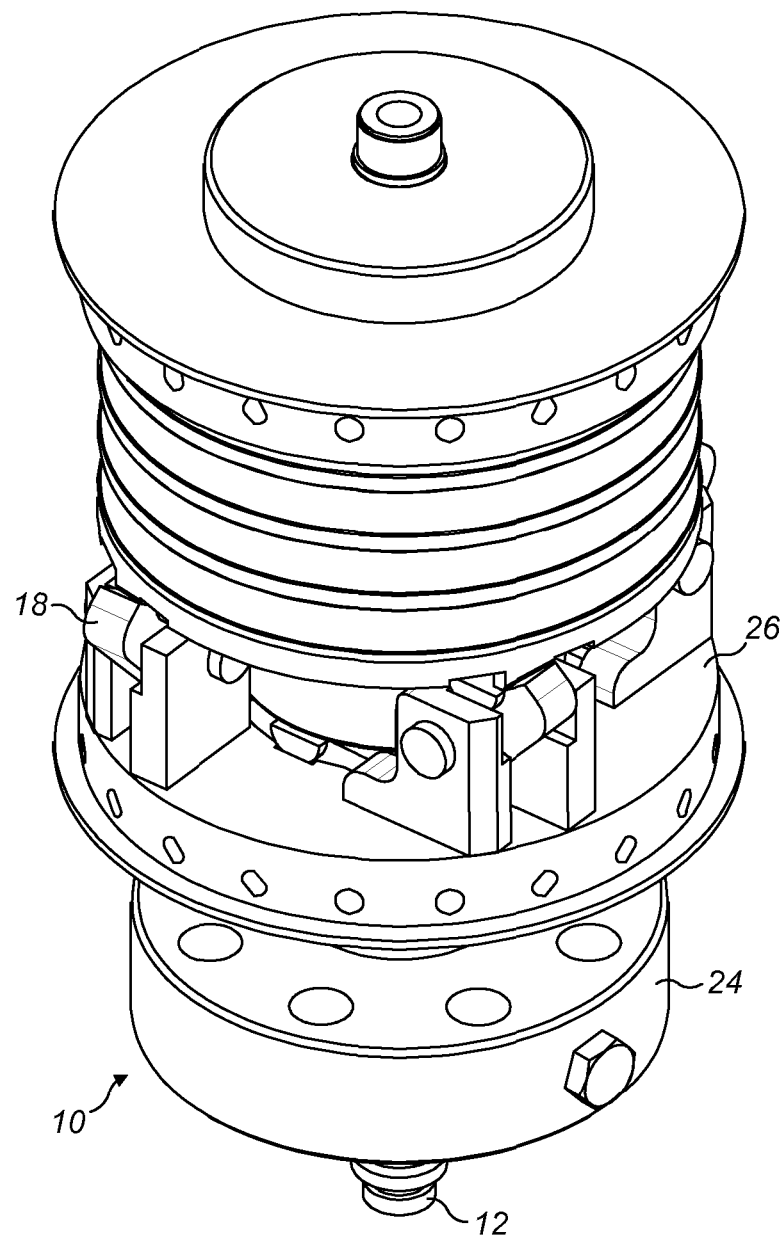
FIG. 6 is an isometric view of the valve actuator of FIG. 1.
Figure 7:
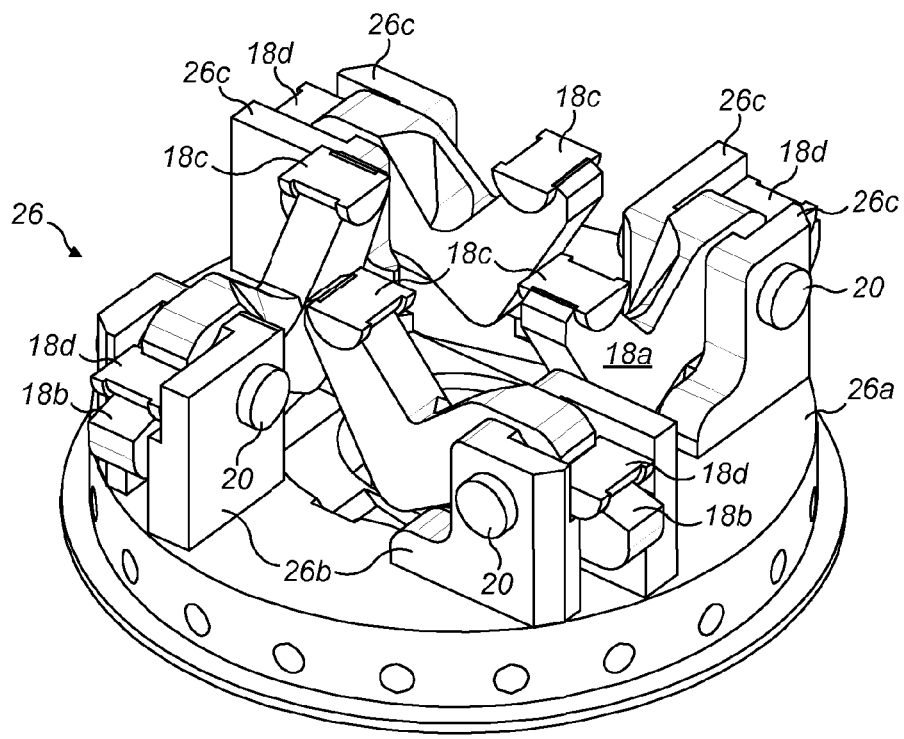
FIG. 7 is an isometric view of the lever plate of the valve actuator of FIG. 1 with the levers in a closed position.
Figure 8:
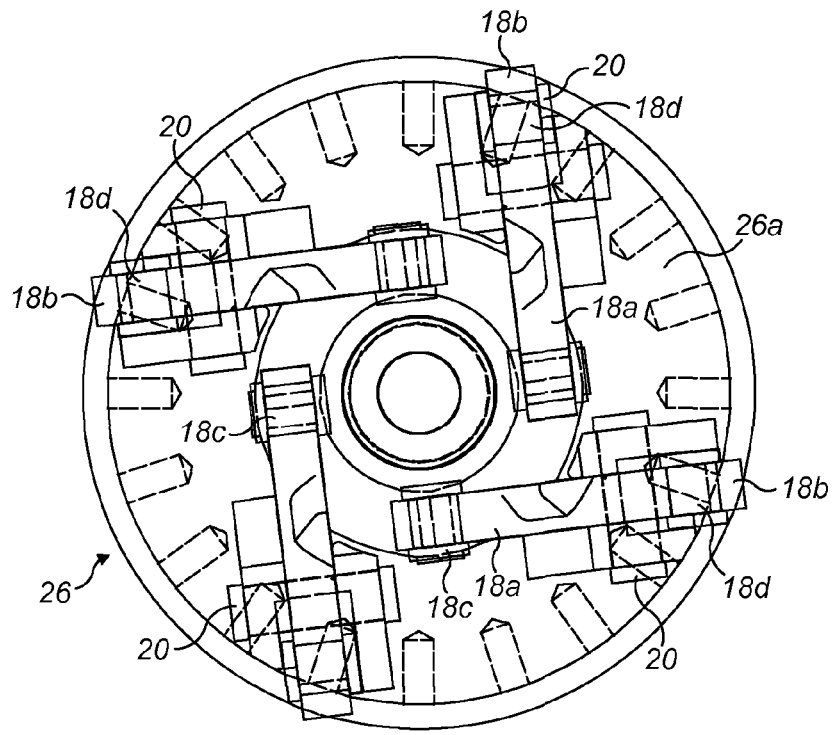
FIG. 8 is a plan view of the lever plate of FIG. 7.
Figure 9:
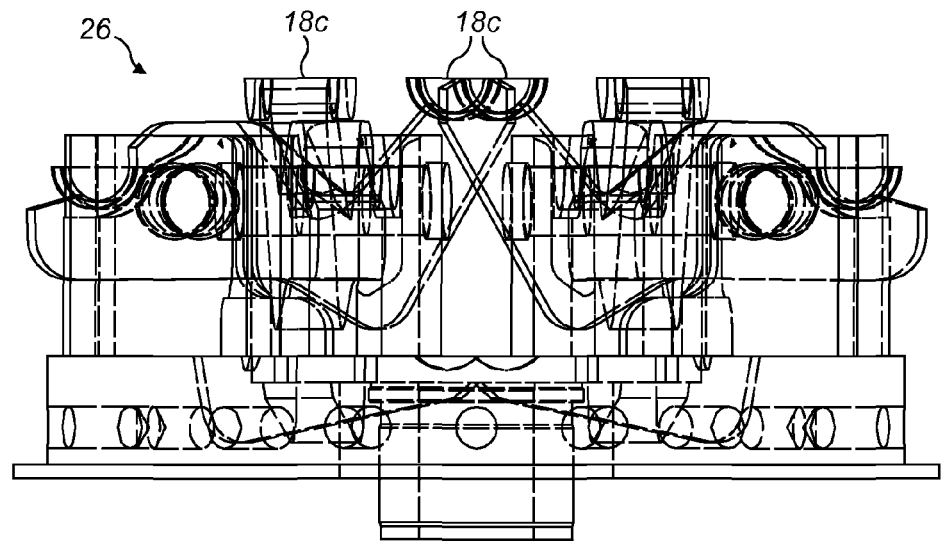
FIG. 9 is a side elevation of the lever plate of FIG. 7.
Figure 10:
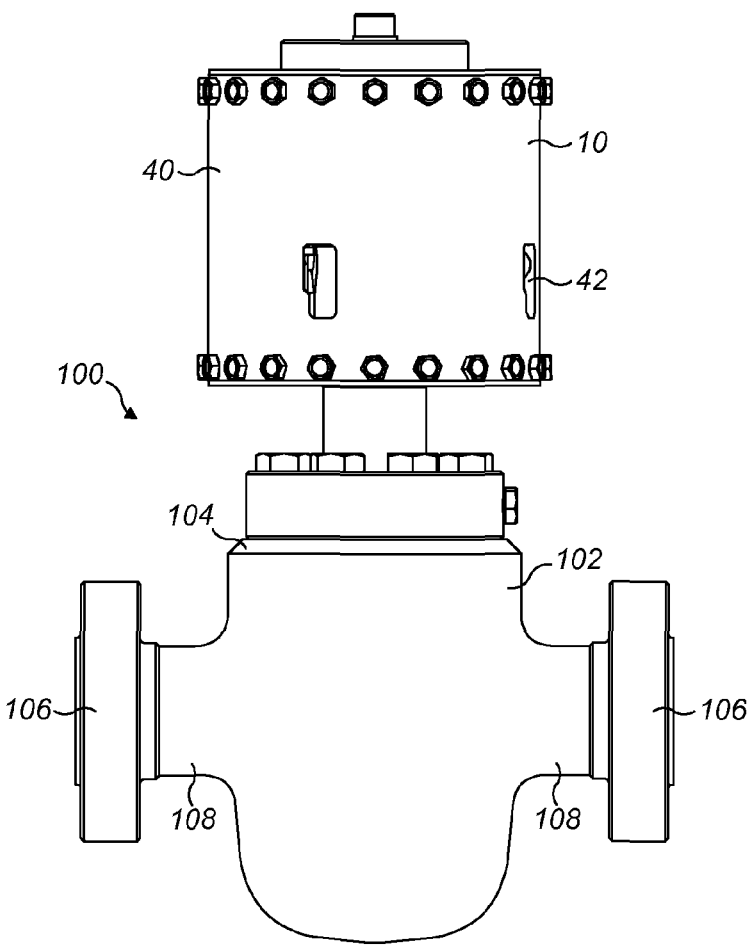
FIG. 10 is a side elevation of a valve according to a second aspect of the present invention.
Figure 11:
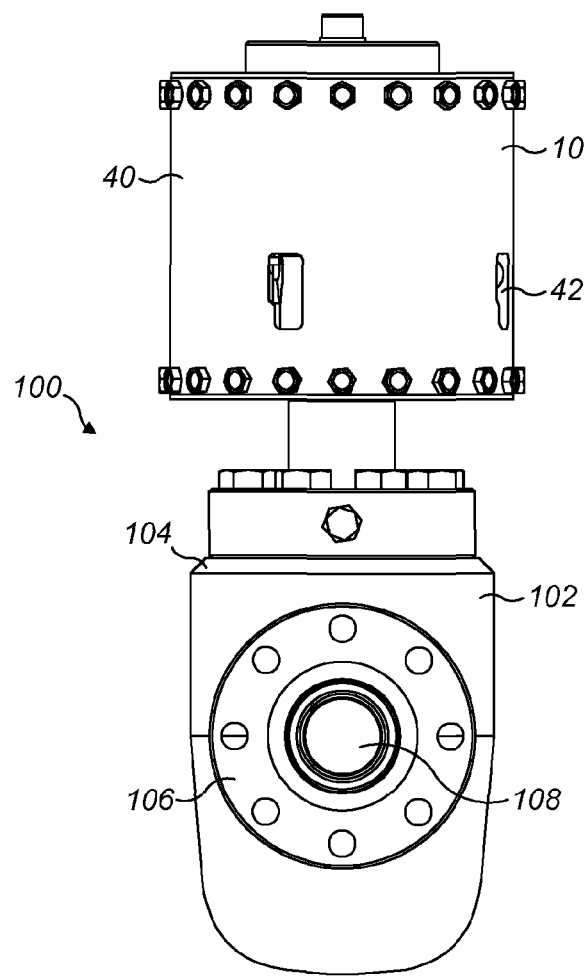
FIG. 11 is an end elevation of the valve of FIG. 10.
Figure 12:
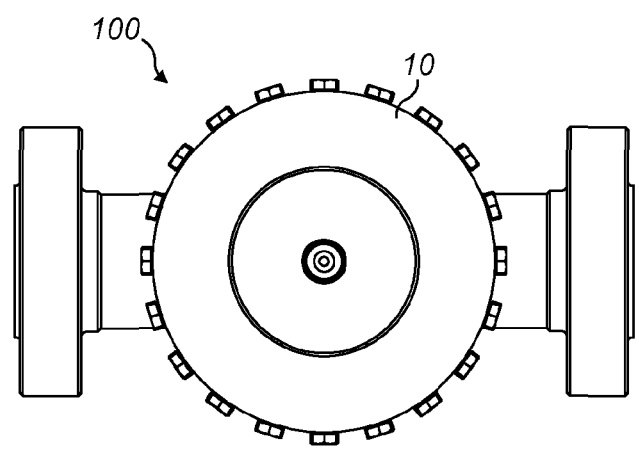
FIG. 12 is a plan view of the valve of FIG. 10.
Figure 13:
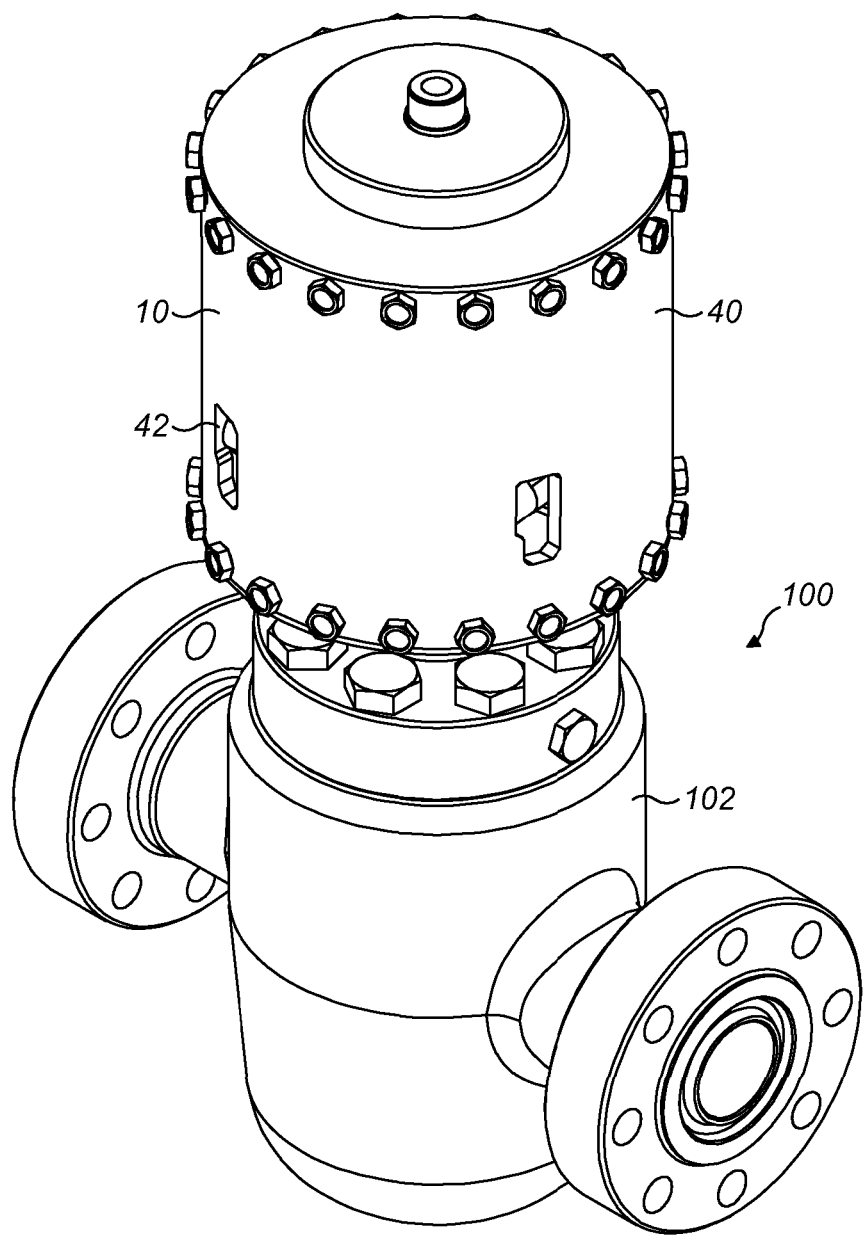
FIG. 13 is an isometric view of the valve of FIG. 10.

As shown in FIG. 4, the levers 18 comprise an inner lever arm 18$a$, which is disposed towards the centre of the lever plate 26, and an outer lever arm 18$b$, disposed towards the perimeter of the lever plate 26. The levers 18 are largely L-shaped. Each of the inner and outer lever arms 18$a$,18$b$ have lever pads 18$c$, 18$d$ attached to its upper surface respectively.

The lower surface of the cylinder 16 contacts the lever pads 18$c$ of the inner lever arm 18$a$. The movable control rod 12 is attached at the centre of the lower surface of the cylinder 16. The cylinder 16 is disposed around the piston 14 (not shown in FIG. 4) and within a cylinder sleeve 28. Best seen in FIG. 2, the piston 14 is connected to the top of the cylinder sleeve 28, and they define an annular volume or gap into which the cylinder 16 is received. There is a tight, but sliding, fit between piston 14 and cylinder sleeve 28 of the one part and cylinder 16 of the other part. Near the uppermost edge of the cylinder 16, disposed within the cylinder 16 and adjacent the outer surface of the piston 14, are seals 30, arranged within seal grooves 32. The seals 30 are standard isomeric seal rings to ensure a sufficient sealing between outer surface of piston 14 and inner surface of cylinder 16.

A central control fluid inlet bore 34 runs through the centre of the piston 14. It forms a fluid communication path between the outside of the actuator 10, and into the space within and between the piston 14 and cylinder 16. The central control fluid inlet bore 34 commences on the upper surface of the piston 14 with an entry aperture 34a defined by an entry lip 34b. The entry lip 34b projects through an upper cylinder sleeve aperture 28b. A circlip 40 holds the two components together.

Around the lower portion of the cylinder 16, there is provided a spring seat 36. The spring seat 36 is a flange. The disc spring arrangement 22 is mounted around the outer surface of the cylinder sleeve 28, the lower edge of the disc spring arrangement biasing against the upper surface of the spring seat 36 and the upper edge biasing against a lower surface of a top plate 38. The top plate 38 is likewise a flange. The top plate 38 is attached securely around an upper portion of the cylinder sleeve 28 but the spring seat 36 is permitted a certain amount of longitudinal travel with respect to the cylinder sleeve 28 such that the disc spring arrangement 22 can be compressed and relaxed between the spring seat 36 and the top plate 38 when the spring seat 36 is respectively longitudinally moved toward and away from the top plate 38. The lower surface (the surface closest to the control rod 12) of the spring seat 36 contacts the lever pads 18d of the outer lever arms 18b.

It will be noted from the attached figures that the upper portion of the cylinder sleeve 28, together with the entry aperture 34a of the central control fluid inlet bore 34, project above the upper surface of the top plate 38.

Prior art actuators will ordinarily include some form of 'position indicator'. In such prior art actuators, this can be achieved by incorporating an indicator stem, which is attached to the moving part of the piston/cylinder arrangement, which penetrates the end of the actuator so that it is visible externally. This is achieved by using a seal arrangement to retain the actuator control pressure whilst allowing the upper portion of the indicator stem, to extend and retract with the movement of the actuator stroke and therefore show whether the valve is in the open or closed position.

In the present invention, this is achieved without the use of an indicator stem, by monitoring movement/position of the levers 18 which are visible through the lever apertures 42 in the cylindrical actuator housing 40.

Turning to FIGS. 10 to 15, there is shown a cylindrical actuator housing 40 arranged and connected between the top plate 38 and the lever plate 26, largely shielding the components arranged between those two plates. Lever apertures 42 are provided around the cylindrical actuator housing 40, corresponding with the locations of the levers 18 and accommodating the movement of the levers 18.

The valve actuator 10 is attached to the top of a valve body 102 of a valve 100. The valve 100 includes the known valve body 102, with a top connection flange 104, and two pipe connection flanges 106. The pipe connection flanges 106 attach to the end of pipe inlets 108.

Within a central chamber 110 of the valve body 102 there is provided a sliding gate (not shown) with a gate aperture (not shown) disposed through it. The gate and therefore gate aperture may be moved up and down in the central chamber 110, and can therefore vary the degree of fluid communication between the two pipe inlets 108 and thus the flow-rate of fluid moving through the valve 100 to be controlled.

The gate is connected to the movable control rod 12, and movement of the movable control rod 12 results in movement of the gate and thus control over the flow-rate. In this embodiment, an upper position of the gate and connected control rod 12 corresponds to a shut position of the gate and the valve 100; whereas a lower position of the gate and connected control rod 12 corresponds to an open position of the gate and the valve 100.

Figure 14:
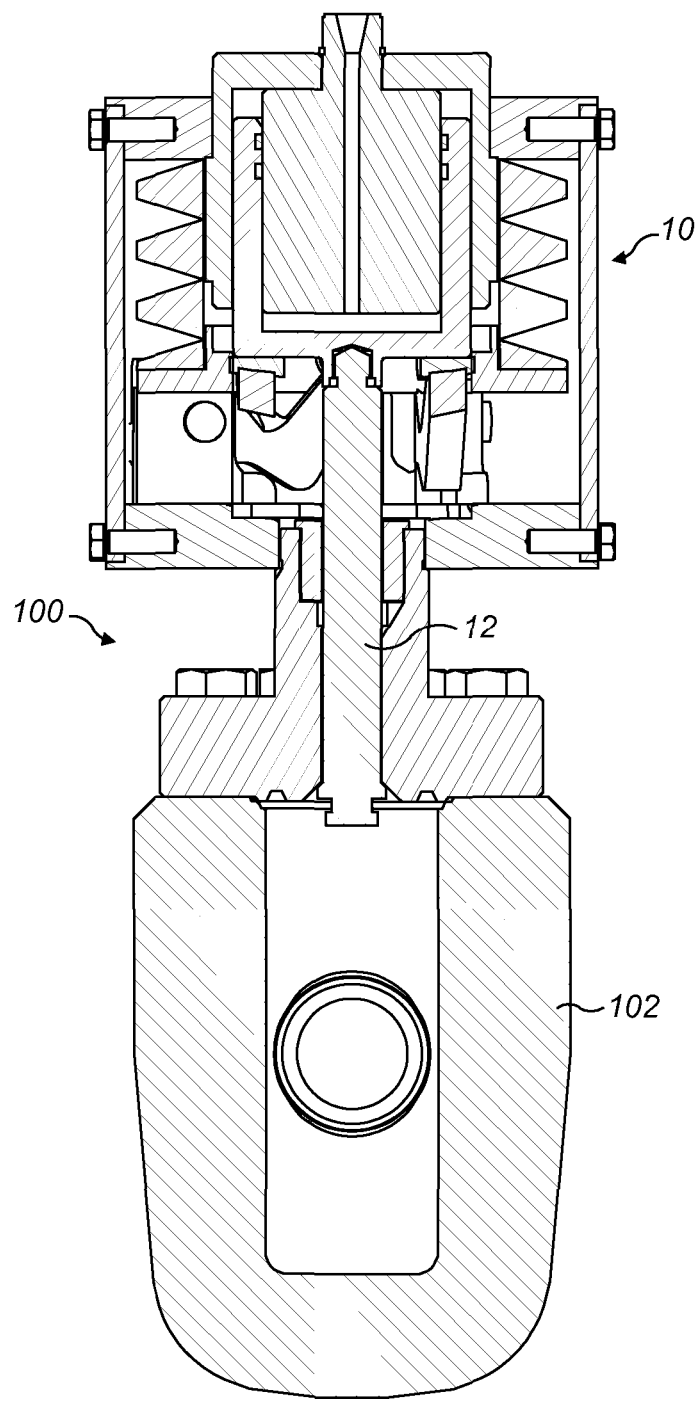
FIG. 14 is an end sectional view of the valve of FIG. 10 with the valve and valve actuator in a closed position.
Figure 15:
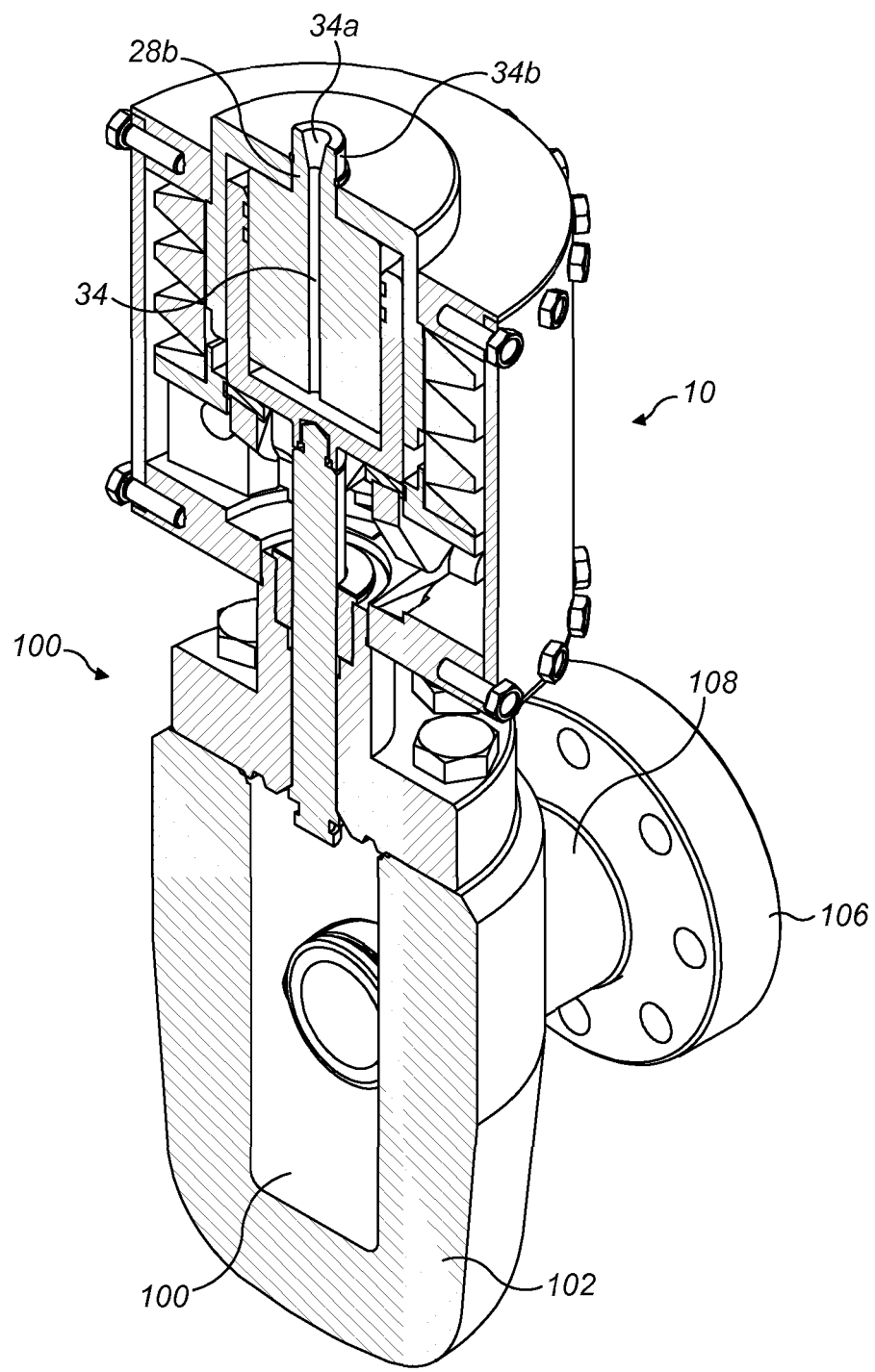
FIG. 15 is an isometric sectional view of the valve of FIG. 10 with the valve and valve actuator in a closed position.

In use, the cylinder 16 starts located fully within the annular gap between piston 14 and cylinder sleeve 28, see FIGS. 14 & 15 and thus the connected gate blocks the pipe inlet 108 because the gate aperture would be out of alignment with the two pipe inlets 108. This is the valve in the fully closed position, with the gate aperture allowing no flow through the valve 100.

To open the valve, a working hydraulic fluid (or pneumatic gas) is fed at pressure into the actuator 10 via the entry aperture 34a of the central control fluid inlet bore 34. The fluid passes through the central control fluid inlet bore 34, and the pressure acts upon the cylinder 16 via its inner surface facing the piston 14. The pressure causes the cylinder 16 to be forced away from the piston 14, the cylinder sidewalls retracting from the annular gap (which is preferably pressure equalised with the outer atmosphere).

This movement of the cylinder 16 also causes movement of the movable control rod 12 and the gate (not shown), moving the gate aperture (not shown) into alignment with pipe inlets 108, opening and eventually permitting fluid flow.

Meanwhile, the cylinder 16 acts upon the levers 18 via the lever pads 18d of the inner lever arm 18a, forcing the inner lever arms 18a downward toward the lever plate 26. The levers 18 are rotatably pinned around lever pivot pins 20, so downward movement of inner lever arms 18a, causes upward movement of outer lever arms 18b away from the lever plate 26.

The outer lever arms 18b act through their corresponding lever pads 18c on the spring seat 36 and the disc spring arrangement 22, compressing the disc spring arrangement 22 and creating a reactionary spring force.

Since the distance between the lever pads 18c of the inner lever arm 18a and the lever pivot pins 20 is greater than the distance between the lever pads 18d of the outer lever arms 18b and the lever pivot pins 20, a gearing ratio is introduced. In the present embodiment, the distance ratio and thus the gearing ratio is 3:1.

Once the valve 100 is to be closed, the pressure of the working fluid is reduced, and the spring force stored in the disc spring arrangement 22 exceeds that pressure, and moves the outer lever arms 18b downward towards the lever plate 26. This in turn, moves the inner lever arms 18a upward, pushing the cylinder 16 back up towards the piston 14. The movement of the cylinder 16 causes the movable control rod 12 and therefore the gate (not shown) to move upward, preventing alignment of the gate aperture with the pipe inlets 108, and therefore stopping fluid flow through the valve 100.

This gearing ratio allows the reduction in the required compression of the disc spring arrangement 22 and provides the advantage that the spring force is three times that which would be required if the force was applied directly to the control rod 12. Therefore, a more compact disc spring arrangement 22 than prior art actuators may be used. Thus, overall length and weight of the actuator may be reduced. Reduction in material required to manufacture may also allow for a reduction in cost. Allowing for a more compact design provides advantage especially in subsea environments where available space for the valve 100/actuator 10 may be severely limited.

Since the cylinder sleeve 28 and entry lip 34b projects above the upper surface of the top plate 38, a useful safety feature is also provided. Since opening the valve 100 depends upon downward movement of the movable control rod 12, this may be actuated manually by forcing the piston 14 downward through the actuator 10, thus mechanically acting upon the cylinder 16 and movable control rod 12.

This is achieved by removing the circlip 40 that attaches the piston 12 to the cylinder sleeve 28 via the entry lip 34b and upper cylinder sleeve aperture 28b. This allows the piston 14 to be moved relative to the fixed cylinder sleeve 28, and downward through the actuator 10, thus mechanically acting upon the cylinder 16 and movable control rod 12, and opening the valve 100. To aid in this, further fittings that attach to the entry lip 34b and further hydraulic actuation means may be provided. For example a cap and bottle jack may be used. This arrangement and ability of the "static" piston to be selectively moved in situations where hydraulic pressure is not available allows for the prior art indicator stem arrangement to be dispensed with.

Figure 16:
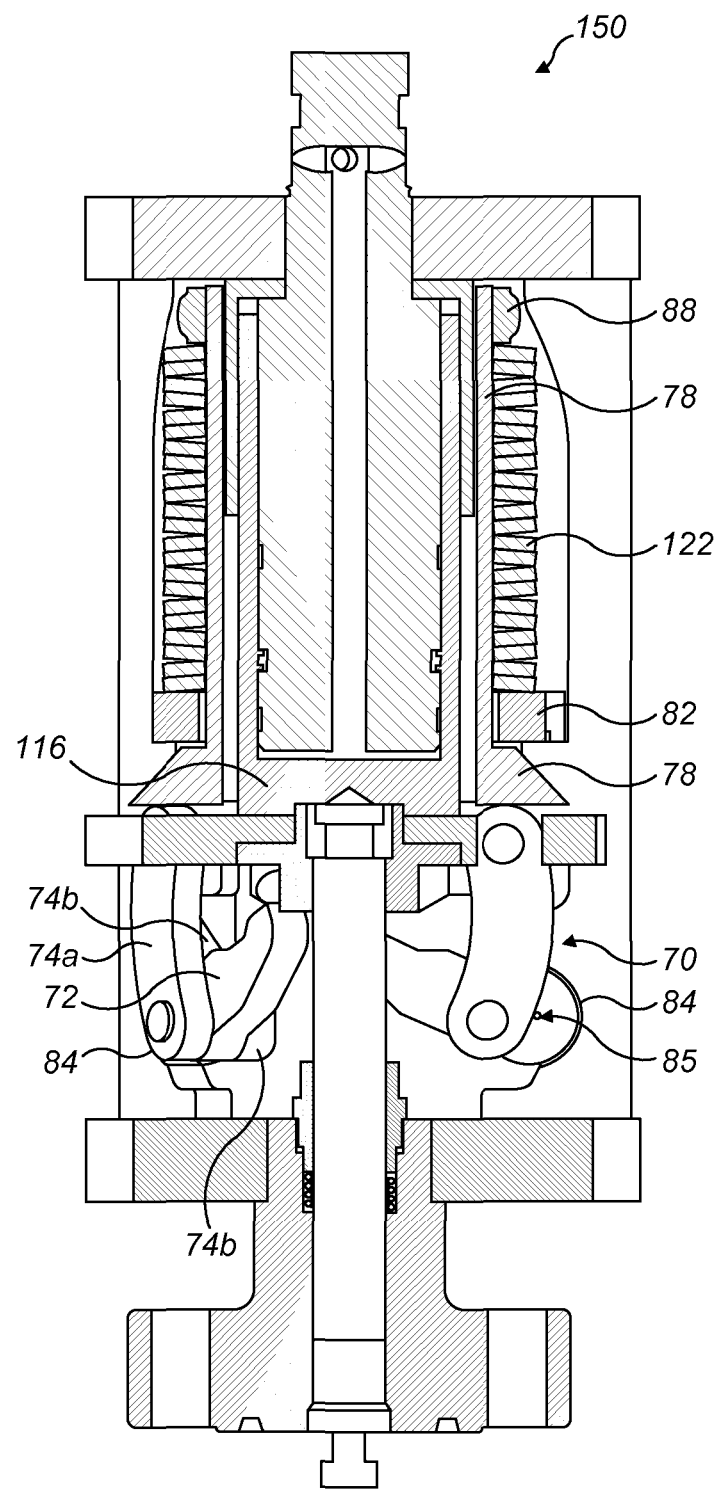
FIG. 16 is sectional view of a second embodiment of an actuator in accordance with the present invention.
Figure 17:
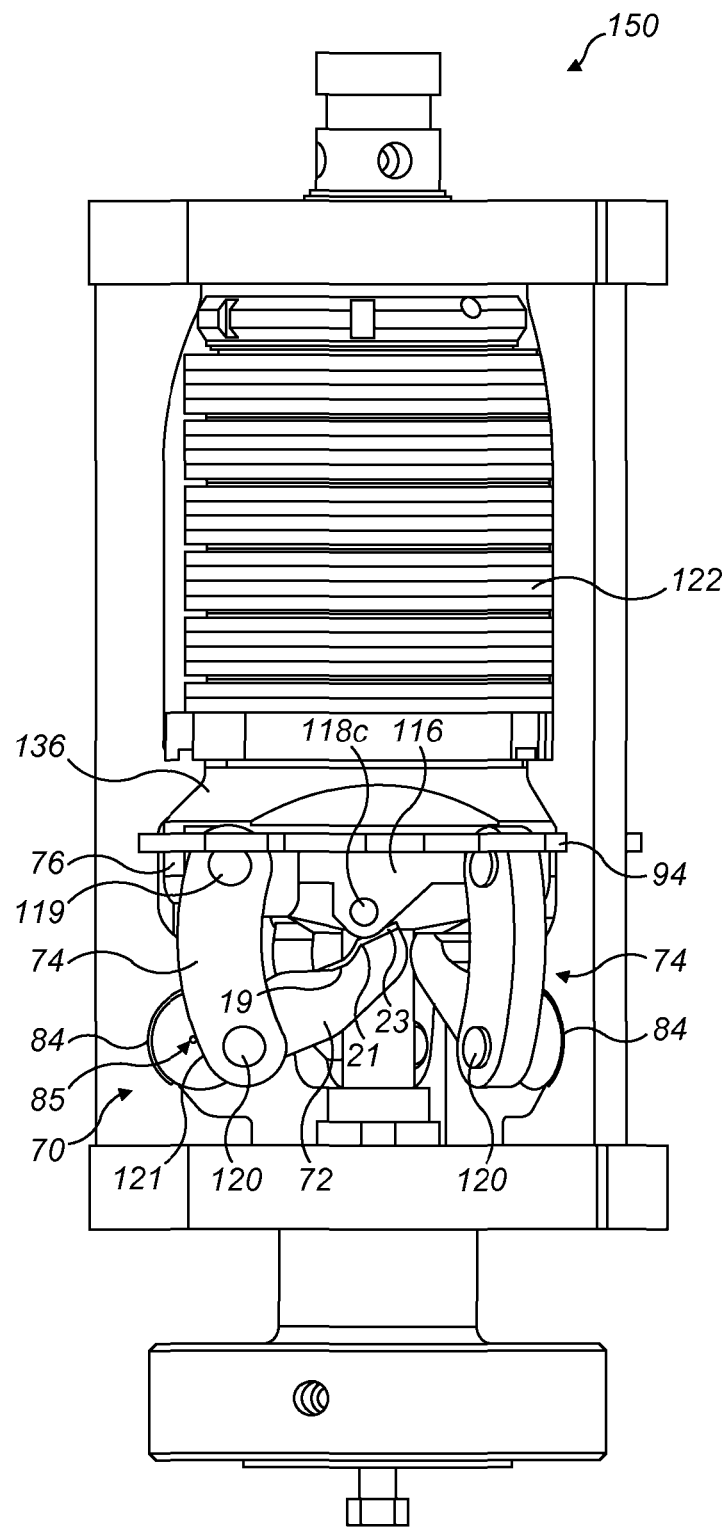
FIG. 17 is a front view of the FIG. 16 embodiment.
Figure 18:
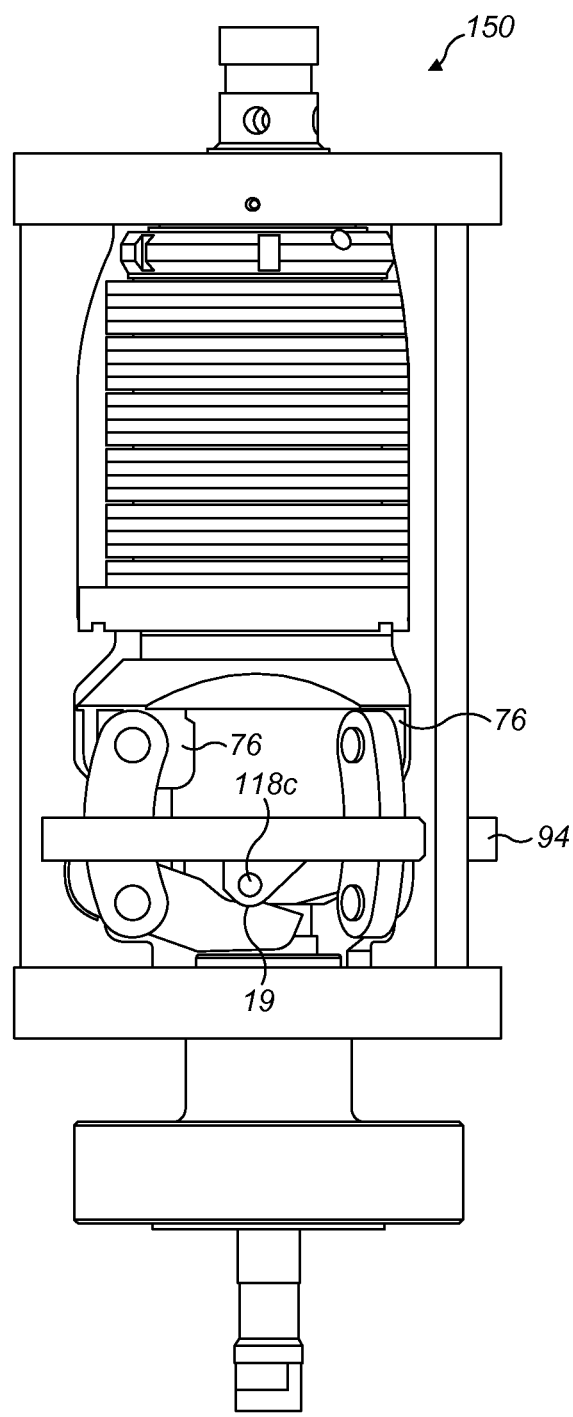
FIG. 18 is a front view of the second embodiment of the FIG. 17 actuator in a stroked position.

A modified embodiment 150 is shown in FIGS. 16 to 18, comprising modified rocker arms 70 in place of levers. Like parts will not be described further and will share common reference numbers with the earlier embodiment except preceded by a '1'.

Rather than pushing upwards to compress the spring stack 122, the rocker arms 70 serve to transmit the downward movement (as shown) of the cylinder 116, to pull down on a spindle 78 and associated bearing ring 88 to move downwards and compress the spring stack 122 from above, between the moveable bearing ring 88 and a stationary spring base 82.

The rocker arms 70 comprise arm linkages in the form of two bars 74a, 74b which move together and enclose therebetween, as well as pivotally connect to, a pivot arm 72 at one end and a lug 76 at an opposite end. The end of the pivot arm 72 near the connection with the arm linkage 74 conforms with a semi-circular recess on the outer structure of the actuator 150 and in use, the pivot arm pivots around a point 85 not around the connection with the arm linkage 74.

The lug 76 is connected to the spindle 78 which extends inside the disc spring stack to an upper bearing ring 88 which extends radially outwards and together with a stationary base 82 encloses the spring stack therebetween.

Instead of a pad, the bottom of the cylinder 116 has a roller 118c which engages with the upper edge 23 of the pivot arm 72.

An anti-rotation plate 94 resists unwanted rotation of the components.

There are three such arrangements equidistantly spaced around the actuator 150.

In use, the cylinder 116 moves downwards under hydraulic pressure as described above for the earlier embodiment, and the pivot arm 72 pivots downwards, to the position shown in FIG. 18. This movement pulls the arm linkages 74 downwards which in turn pull on the lugs 76 (shown in FIGS. 17 and 18), attached spindle 78 and bearing ring 88 which all move downwards. Accordingly the spring stack 122 is compressed from above by movement of the bearing ring 88 towards the stationary base 82.

The relative sizing of the arm linkages 74 and the pivot arm 72, as well as the position of the pivot points 85, 120 provides a gearing reduction from the movement of the cylinder to the movement of the spindle 78, bearing ring 88 and disc spring stack 122.

Preferred embodiments of the invention provide more force to the end of the stroke of the spring stack (than the spring stack naturally would of its on accord) in order to aid closure of the attached valve especially where cutting of a cable extending through the valve may be required.

To provide for this, and as best shown in FIG. 17, the upper edge 23 of the pivot arm 72 has a notch 19 towards its end (i.e. towards the centre of the actuator 150) thus defining a shoulder 21 on the upper edge 23 at the end of the pivot arm 72. Starting from the innermost end (i.e. the end closest to the centre of the actuator 150) of the pivot arm 72 and moving along the upper edge 23, the shoulder 21 has a relatively steep slope into the notch 19, and then a relatively moderate slope out of the notch 19.

In operation the cylinder 116 provided within the spring arrangement 122 is pushed down by hydraulic activation, the rollers 118c at the bottom of the cylinder 116 push the pivot arm 72 downwards causing the rollers 118c to move off the shoulder 21 and through the notch 19. Meanwhile, the pivot arm 72 pivots about pivot point 85 within the recess 84 pulling down the arm linkage 74 along with the spindle 78 and attached bearing ring 88, thus compressing the disc spring arrangement 122 during downward movement of the cylinder 116. FIG. 18 shows this stroked position. The attached gate valve (not shown) is thus opened.

In the event of hydraulic loss, the spring arrangement 122 will act on the bearing ring 88, moving the spindle 78 upwards along with the arm linkage 74, to push the pivot arm 72 upwards, along with the attached cylinder 116, control rod 112 and gate and so close the valve. As the rollers 118c travel along the edge 23 from near the pivot point 120 of the pivot arm 72 they will reduce the upward force as the rollers extend into the notch 19. However as the rollers 118c move from the notch 19 to the shoulder 21, the force is greatly increased because of the steep slope of the notch/shoulder 19/21 at this end. As shown in the figures, this happens near the end of the cylinder's upward stroke and so provides an extra force at this point which corresponds with the point where the gate valve will be almost closed.

An important benefit ensues. The inventor of the present invention has recognised that existing actuators with spring closure mechanisms concentrate greater closing force at the beginning of the closing stroke, when the spring is at its most compressed configuration and a smaller closing force at the end of its closing stroke, when the spring is almost in its relaxed configuration. However the inventor of the present invention has also recognised that more force is required to close the valve at the end of the closing stroke, especially when it may need to sever a cable or the like in an emergency, than at the beginning of the stroke. Embodiments of the present invention, such as that shown in FIGS. 16-18, provide an additional benefit that additional closure force than normal is provided at the end of the closing stroke of the valve where it has been found to be more required.

Thus whilst there exists a gearing reduction ratio from the cylinder 116 to the spring 122 of about 3:1 in general (the spring compresses ⅓ of the distance that the cylinder 116 travels), towards the unloaded end of the spring's stroke, the gearing reduction ratio is reduced to less than 3:1 (for example to 2:1) so that more force is exerted from the spring to the cylinder 116 at this point.

However it should be noted that such embodiments of the present invention do not necessarily increase the force of the actuator at the end of its stroke compared to the start of its stroke since the spring still exerts a different amount of force at different points in its stroke. Rather, such embodiments increase the force at the end of the stroke compared to the force which would be applied without the shoulder/notch (or other mechanisms) to vary the gearing reduction ratio within its stroke.

The above description and statements refer to an increase in the force applied by the moveable portion (cylinder 116) to the resilient element (spring 122) as the moveable portion (cylinder 116) moves towards the second position, wherein the resilient element (spring 122) is in its relatively loaded position. This increase in force is provided by the relative movement of the pivot point 85 of pivot arm 72 and the pivot point 120 between the pivot arm 72 and arm linkage 74. As the pivot arm 72 is pushed down by the cylinder 116, the two pivot points 85, 120 get closer together in terms of their horizontal distance separation. The reader will understand that, in the opposite direction of travel, when the force of the resilient element (spring 122) is being applied to the moveable portion (cylinder 116), and the pivot arm 72 is being pulled up by the action of the spring 122, the force applied by the spring 122 is increased as the distance in terms of their horizontal distance separation between the two pivot points 85, 120 increases as the pivot points 85, 120 move away from one another. The changing force applied by the spring 122 to the cylinder 116 due to the inherent characteristics of the spring has not been considered in the above explanation.

The above description and statements also refer to the transmission mechanism or lever (pivot arm 72) being used to increase the force applied to the moveable portion (cylinder 116) by the resilient element (spring 122), as the moveable portion (cylinder 116) moves towards the first position, and wherein the resilient element (spring 122) is in the relatively unloaded position. This increase in force is provided by the shape of the transmission mechanism or lever (pivot arm 72). The upper edge 23 of the pivot arm 72 increases the force applied by the spring as the spring expands towards its first position, and as the roller 118c of the cylinder 116 moves from the notch 19 to the shoulder 21 and up onto the edge 23.

It is also important to note that movement of the roller 118c of the cylinder 116 down the shoulder 21 and into the notch 19 reduces the force applied by the cylinder 116 to the spring 122, as the spring is compressed towards its second, relatively loaded position. This is important because it limits compression of the spring 122 and thereby helps to avoid damage to the spring 122 caused by over-compression.

With reference to the gearing ratio, the gearing ratio increase or when the gearing reduction ratio is increased may refer to a ratio change from about 2:1 to 6:1. The gearing ratio decrease or when the gearing reduction ratio is reduced may refer to a ratio change from about 6:1 to 2:1. The ratios refer to the moveable portion (cylinder 116) having the ratio values of 2 or 6 and resilient element (spring 122) having the ratio value of 1. The reader will understand that the effect the spring 122 has on the cylinder 116 is also at least in part, determined by the ratio.

Figure 20:
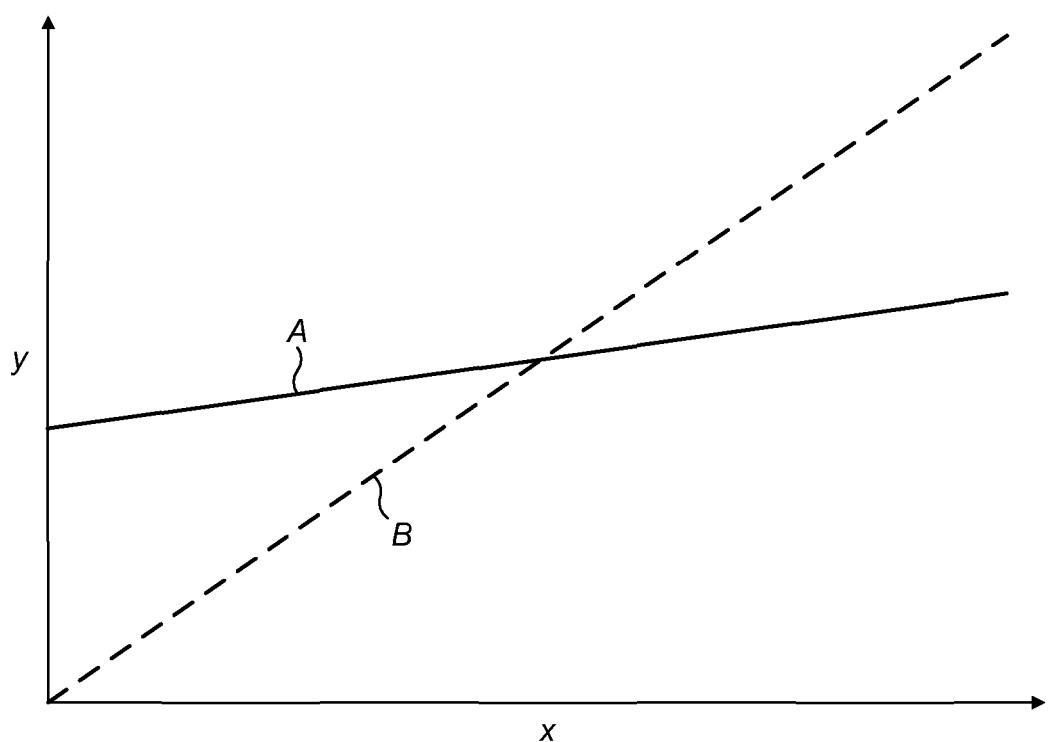
FIG. 20 is a graph of the hydraulic pressure supplied to the cylinder on the y-axis and progress of the stroke of the actuator or compression of the spring on the x-axis.

The combined effect of the distance between the two pivot points 85, 120 and the shape of the pivot arm 72 has on hydraulic pressure required to compress the spring 122 compared to the position of the stoke of the actuator is shown in FIG. 20. FIG. 20 is a graph of increasing hydraulic pressure supplied to the cylinder on the y-axis and progress of the stroke of the actuator or compression of the spring on the x-axis.

FIG. 20 shows that the hydraulic pressure supplied to the cylinder 116, required to start to compress the spring 122 from its relatively unloaded position towards it relatively loaded position according to the present invention (A), is relatively high compared to the pressure required to start the compression of a spring in an actuator of the prior art (B). The hydraulic pressure required to continue to compress the spring 122 of the actuator of the present invention (A) increases only slowly compared to the increase in pressure required to continue to compress a spring in a actuator of the prior art (B).

Towards the loaded end of the spring's 122 stroke, the gearing reduction ratio may be increased to more than 3:1 so that less force is exerted from the spring to the cylinder 116 at this point, than had the gearing reduction ratio not been increased. The skilled reader will however understand that because the spring 122 is storing greater potential energy at the loaded position, then more force will be exerted by it when it starts on its stroke towards the relatively unloaded position, than when it is at the unloaded position.

Figure 19:
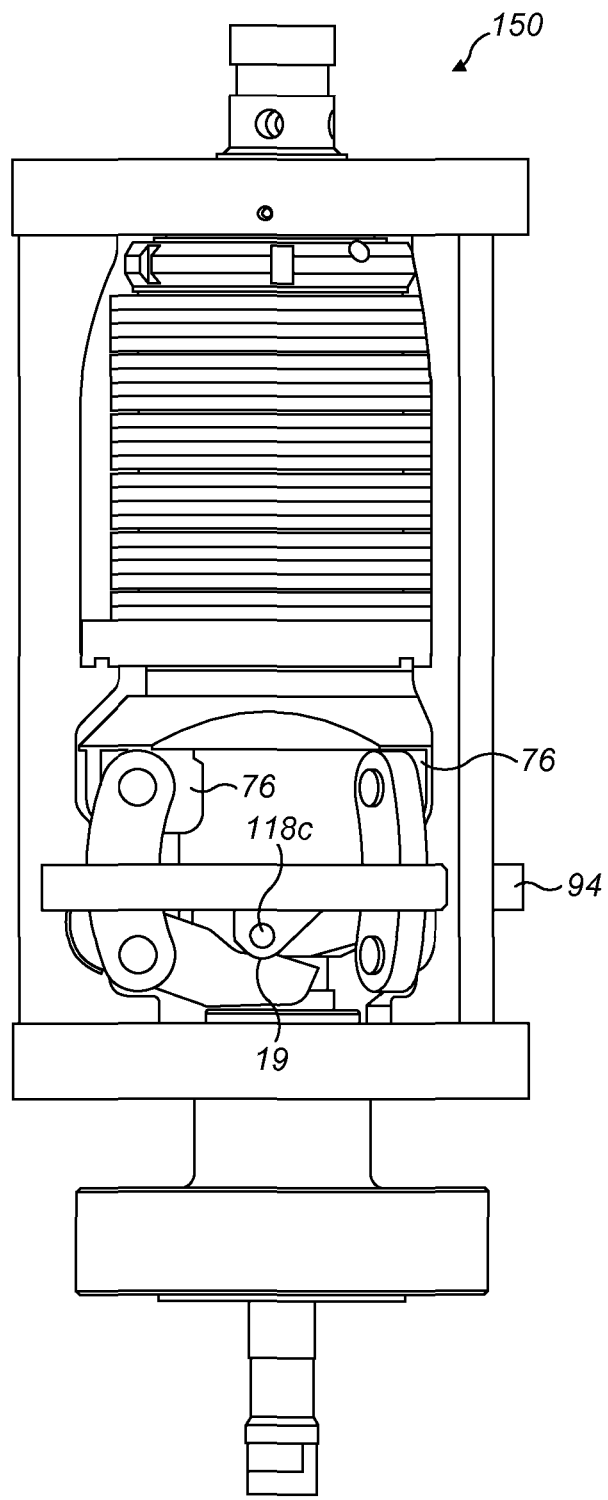
FIG. 19$a$ is a plan view of a third embodiment of an actuator in accordance with the present invention.
Figure 19A:
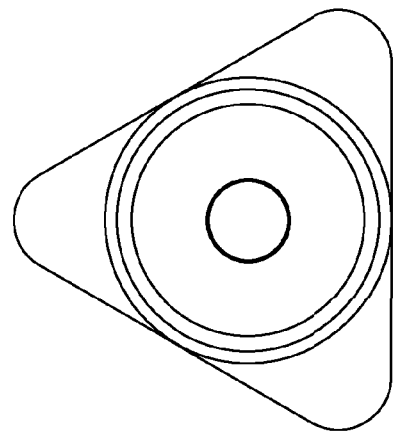
Figure 19B:
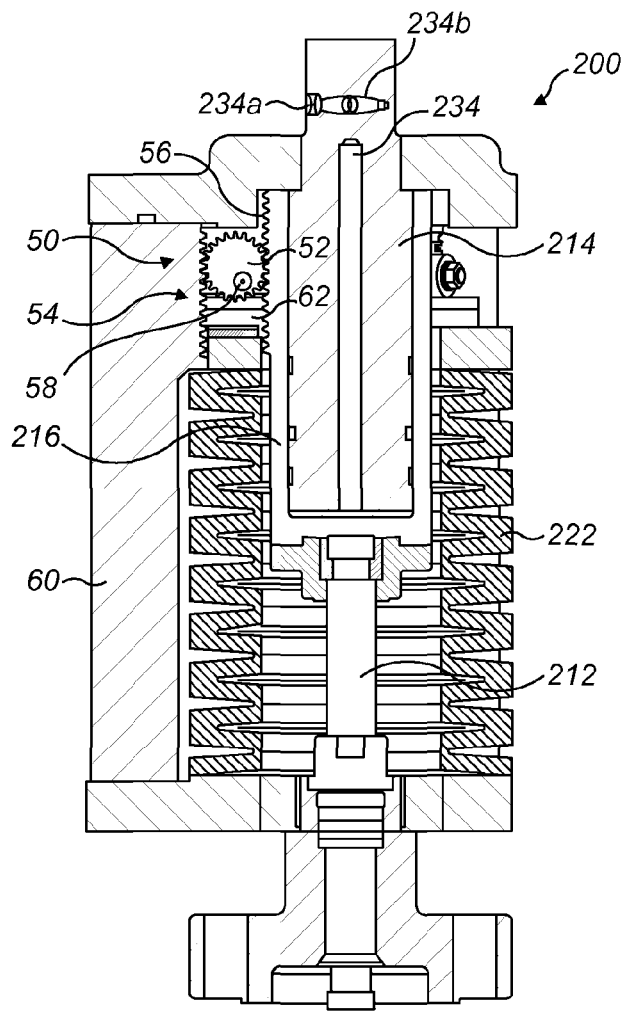

A further embodiment is shown in FIG. 19b which shows an actuator 200. Like parts will not be described further and will share common reference numbers with the earlier embodiment except preceded by a '2'.

In common with the first embodiment, the actuator 200 comprises a movable control rod 212, a stationary piston 214 housed within a moveable cylinder 216, and a spring arrangement comprising a plurality of disc springs 222 disposed around the cylinder 216.

In contrast to the first embodiment, the actuator 200 has a different transmission mechanism to bias the cylinder 216 in the upwards position. The transmission mechanism is in the form of a rack and pinion mechanism 50 comprising a circular pinion or toothed wheel 52, a static rack 54 provided on an outer wall 60 and a moveable rack 56 provided on an outer face of the cylinder 216. An axle 58 extends through the toothed wheel 52 and a portion of the axle 58 extends outwardly from both sides of the toothed wheel 52. These portions of the axle 58 abut with a ring 62 provided above the disc spring arrangement 222.

Putting aside the off-centre position of the axle 58 with respect to the toothed wheel 52 for now, the transmission mechanism works as follows: hydraulic fluid is entered into the conduit 234 via the port 234a which pushes the cylinder 216 away from the piston 214 and so in a downwards direction. The attached control rod 212 opens the gate valve; all as described for earlier embodiments. For this particular embodiment, movement of the cylinder 216 in this direction rotates the toothed wheel 52. The toothed wheel 52 thus moves down the static rack 54 and up the cylinder rack 56. The axle 58 abuts with the ring 62 above the spring 222 and so compresses the spring 222 as the cylinder 216 moves downwards.

In the event that the hydraulic power is lost, the spring 222 will urge the axle 58 and toothed wheel 52 in an upwards direction which will bring the cylinder 216 and control rod 212 with it and so close the attached gate valve.

Notably, the spring 222 will be compressed by a smaller vertical extent than the movement of the cylinder 216 and so, like the earlier embodiments, has the advantage that a more compact actuator can be provided.

Returning to the off-centre position of the axle 58, the axle 58 is provided in an off centre position in the bottom right hand quarter of the wheel 52 at an approximately a 5 o'clock position when the cylinder 216 is in its upward position, as shown in FIG. 19b, and the spring is relatively unloaded. As the cylinder 216 moves downwards away from the position of FIG. 19b, the downwards movement of the toothed wheel 52 occurs as described above, but the downwards movement of the axle 58 is increased because it simultaneously moves from the 5 o'clock position to the 3 o'clock position. On continued downward movement of the cylinder 216, the axle 58 then slows relative to the toothed wheel 52 again as it moves from the 3 o'clock position to the 1 o'clock position; where movement of the cylinder 216 stops and the spring is relatively loaded. Thus the spring arrangement 222 is compressed more in the middle of the stroke of the cylinder and compressed less towards the ends of this stroke.

In the event of loss of hydraulic power, the spring arrangement 222 will close the gate valve by generally the same mechanism described earlier. The increased expansion of the spring arrangement 222 in the middle of the stroke will increase the closing force of the actuator 200 shortly before it closes. This is particularly useful, because, extra force is often be required to sever a cable or the like extending through the valve before the valve finally closes. Thus such embodiments of the present invention increase the force exerted by the spring arrangement to the point in the stroke of the gate where it is most needed compared to known actuators.

Thus in contrast to known actuators where the force is gradually reduced as the resilient element is unloaded, a relatively more constant amount of force may be applied to the actuator along the stroke of the resilient element.

A further beneficial consequence of such gearing is that the time taken to shut the valve is less than the time for known actuators, normally because the closing force is relatively consistent not diminishing as with ungeared actuators. For example one known actuator takes approximately 6 seconds to close a particular size of valve whilst the actuator according to the present invention takes about 4.5 seconds to close the same size of valve.

References to upward/downward movement etc all relate to the embodiments as drawn in the figures, or as described, and are relative and do not require movement or orientation in these absolute directions or positions.

Modifications and improvements can be made to the embodiments herein before described without departing from the scope of the invention. For example, the resilient element need not be a disc spring, but may be a coil spring or other suitably resilient component for the task.

The gearing reduction ratio may be altered from 3:1 or 2:1 to other suitable ratios by the choice of suitably shaped levers or rocker arms. The resilient element need not be disposed around the cylinder and piston arrangement, but may be on top of or beneath, or indeed the resilient element may be itself disposed within a suitable propulsion device. For example, it may also be that a piston arrangement is housed within the annular space and becomes a ring with inner and outer seals, and the resilient element is housed within the centre of the actuator. The levers or rocker arms would be reversed so that the reduced movement takes place at the centre of the actuator and the stem is attached to a disk with the levers or rocker arms acting upon the disc at the larger outer diameter of the actuator.

Moreover, the relative directions of movement of the propulsion device and the compression of the resilient element need not be parallel, but may be at any angle, which is an additional benefit provided by the use of a levering system.

Other transmission mechanisms may be used such as one based on a wire and pulley mechanism.

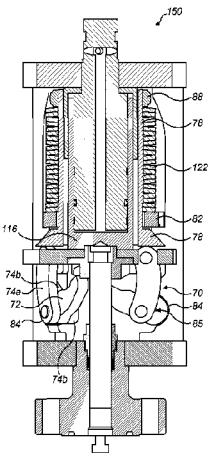

The invention claimed is:

1. A valve actuator comprising:
    a movable control element moveable in a longitudinal direction;
    a propulsion device for moving said movable control element, the propulsion device comprising a moveable portion moveable in the longitudinal direction having a stroke extending from a first position to a second position;
    a resilient element, having a stroke extending in the longitudinal direction from a first relatively unloaded position to a second relatively loaded position; and,
    a transmission mechanism;
    the resilient element being loaded in the longitudinal direction under action of the propulsion device via the transmission mechanism and being configured to urge the moveable portion of the propulsion device in the longitudinal direction towards the first position via the transmission mechanism when loaded;
    wherein the transmission mechanism provides a gearing ratio between the moveable portion of the propulsion device and the resilient element;
    wherein the transmission mechanism is configured to vary the gearing ratio between the moveable portion of the propulsion device and the resilient element within the stroke of the moveable portion of the propulsion device;
    wherein the transmission mechanism comprises:
    a pivotable lever arm having one end pivotally coupled around a pivot point to an outer structure of the valve actuator and another end, and further comprising a surface which engages with the moveable portion; and
    an arm linkage, which arm linkage is pivotally coupled to the lever arm at a separate point on the lever arm between the said one end and another end where said separate point is spaced apart from the said pivot point;
    wherein movement of the moveable portion in the longitudinal direction causes the lever arm to pivot around the said pivot point which causes the arm linkage to move in the longitudinal direction and which is translated to smaller longitudinal movement of the resilient element.

2. The valve actuator as claimed in claim 1, further comprising an anti-rotation plate which in use resists unwanted rotation of the transmission mechanism.

3. The valve actuator as claimed in claim 1, wherein the moveable portion of the propulsion device follows the said surface of the lever arm, and the said surface of the lever arm is shaped to transmit additional force at a particular point in the stroke of the moveable portion of the propulsion device.

4. The valve actuator as claimed in claim 1, wherein the transmission mechanism is configured to provide a gearing reduction ratio between the moveable portion of the propulsion device and the resilient element, within the stroke of the moveable portion of the propulsion device.

5. The valve actuator as claimed in claim 4, wherein the gearing reduction ratio is reduced as the resilient element nears one end of a stroke of the resilient element, that is between 50% and 95% of a distance through the stroke of the resilient element.

6. The valve actuator as claimed in claim 4, wherein the gearing reduction ratio is reduced as the resilient element is close to a first relatively unloaded position, that is more than 70% of a distance through a stroke of the resilient element towards a relatively unloaded position.

7. The valve actuator as claimed in claim 4, wherein the gearing reduction ratio is increased as the resilient element nears one end of a stroke of the resilient element, that is between 50% and 95% of a distance through the stroke of the resilient element.

8. The valve actuator as claimed in claim 4, wherein the gearing reduction ratio is increased as the resilient element is close to a second relatively loaded position, that is more than 70% of the distance through a stroke of the resilient element towards a relatively loaded position.

9. The valve actuator as claimed in claim 8, wherein the lever arm and moveable portion of the propulsion device engage via a roller.

10. The valve actuator as claimed in claim 1, wherein a notch and/or shoulder is/are provided on the said surface of the lever arm so that a relatively steep gradient exists on the said surface of the lever arm.

11. The valve actuator as claimed in claim 1, wherein the resilient element is compressed by the lever arm in a direction opposite a direction of movement of the moveable portion of the propulsion device.

12. The valve actuator as claimed in claim 1, wherein the resilient element is compressed by the lever arm in the same direction as a direction of movement of the moveable portion of the propulsion device.

13. The valve actuator according to claim 1, wherein the propulsion device is a piston and cylinder arrangement.

14. The valve actuator according to claim 13 wherein the moveable portion of the propulsion device is a cylinder.

15. The valve actuator according to claim 14 wherein the cylinder is disposed around said piston and a cylinder sleeve disposed around said cylinder.

16. The valve actuator according to claim 15 wherein said piston and cylinder sleeve are joined, providing an annular gap or volume for receiving the cylinder.

17. The valve actuator according to claim 15 wherein said piston and cylinder sleeve may be selectively decoupled to allow for selective relative movement of the two.

18. The valve actuator according to claim 1 wherein the resilient element is disposed around the outside of the propulsion device.

19. The valve actuator according to claim 1 wherein the resilient element is a spring.

20. The valve actuator according to claim 1 wherein the resilient element comprises a stack of disc springs.

21. The valve actuator according to claim 1 wherein the resilient element is attached to a first plate at its first end and a second plate at its second end and wherein said first plate is moveable and said second plate is fixed.

22. The valve including a valve actuator according to claim 1.

23. The pipeline including at least one valve according to claim 22.

* * * * *

UNITED STATES PATENT AND TRADEMARK OFFICE
CERTIFICATE OF CORRECTION

| | | |
|---|---|---|
| PATENT NO. | : 9,151,403 B2 | |
| APPLICATION NO. | : 13/822218 | |
| DATED | : October 6, 2015 | |
| INVENTOR(S) | : David Wade Webster | |

It is certified that error appears in the above-identified patent and that said Letters Patent is hereby corrected as shown below:

Replace the Title Page with the attached Title Page

In the Drawings

Remove Fig. 19

Signed and Sealed this
Eighth Day of March, 2016

Michelle K. Lee
*Director of the United States Patent and Trademark Office*

CERTIFICATE OF CORRECTION (continued)

(12) United States Patent
Webster

(10) Patent No.: US 9,151,403 B2
(45) Date of Patent: Oct. 6, 2015

(54) VALVE ACTUATOR

(75) Inventor: David Wade Webster, Monmouth (GB)

(73) Assignee: KOP SURFACE PRODUCTS SINGAPORE PTE. LTD., Singapore Science Park (SG)

( * ) Notice: Subject to any disclaimer, the term of this patent is extended or adjusted under 35 U.S.C. 154(b) by 0 days.

(21) Appl. No.: 13/822,218

(22) PCT Filed: Nov. 2, 2011

(86) PCT No.: PCT/GB2011/052134
§ 371 (c)(1),
(2), (4) Date: Mar. 11, 2013

(87) PCT Pub. No.: WO2012/059759
PCT Pub. Date: May 10, 2012

(65) Prior Publication Data
US 2013/0168582 A1    Jul. 4, 2013

(30) Foreign Application Priority Data
Nov. 3, 2010    (GB) .................................. 1018553.6

(51) Int. Cl.
*F16K 31/12* (2006.01)
*F16K 31/122* (2006.01)
*F15B 15/14* (2006.01)
(Continued)

(52) U.S. Cl.
CPC .......... *F16K 31/1221* (2013.01); *F15B 15/1476* (2013.01); *F16K 31/163* (2013.01); *F16K 31/523* (2013.01); *F16K 31/54* (2013.01)

(58) Field of Classification Search
CPC ..... F16K 31/46; F16K 31/1221; F16K 17/36; F16K 31/523; F16K 31/163; F16K 31/54; F15B 15/1476

USPC ........................................ 251/74, 58, 63.6, 73
See application file for complete search history.

(56) References Cited

U.S. PATENT DOCUMENTS 1,103,944 A * 7/1914 Creighton ........................ 137/77
1,632,024 A * 6/1927 Dennison ................. 137/505.18
(Continued)

FOREIGN PATENT DOCUMENTS

| GB | 1278292 A | 6/1972 |
| JP | 4248084 A | 9/1992 |

OTHER PUBLICATIONS

Lanel, F., "International Search Report" for PCT/GB2011/052134, as mailed Mar. 20, 2012.

*Primary Examiner* — Marina Tietjen
*Assistant Examiner* — Umashankar Venkatesan
(74) *Attorney, Agent, or Firm* — Winstead PC

(57) ABSTRACT

The valve actuator (10) has a movable control element (12) which is typically connected to the valve to be opened/closed and a propulsion device (16) which may be a hydraulically operated piston (16) for moving the movable control element. A resilient element (22) which may be in the form of a spring arrangement has a stroke extending from a first relatively unloaded position to a second relatively loaded position and a transmission mechanism (18) is also provided, where the resilient element is loaded under the action of the propulsion device via the transmission mechanism and is configured to urge the moveable portion of the propulsion device towards the first position via the transmission mechanism when loaded. The transmission mechanism provides a gearing ratio reduction between the moveable portion of the propulsion device and the resilient element.

23 Claims. 17 Drawing Sheets